June 24, 1941.                H. S. JONES                2,246,686
                             CONTROL SYSTEM
                          Filed Aug. 3, 1937              6 Sheets-Sheet 1
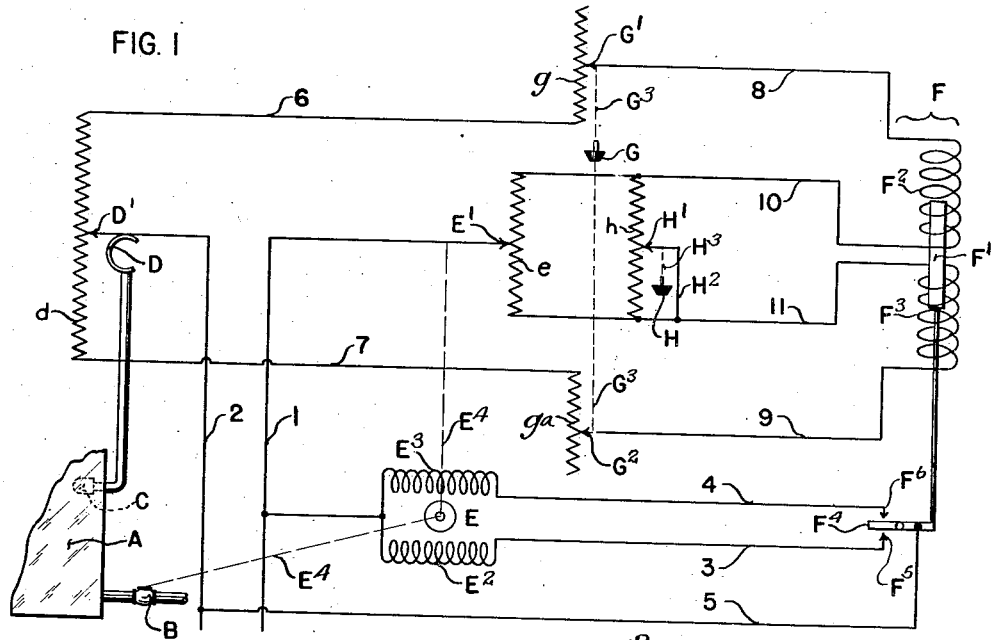
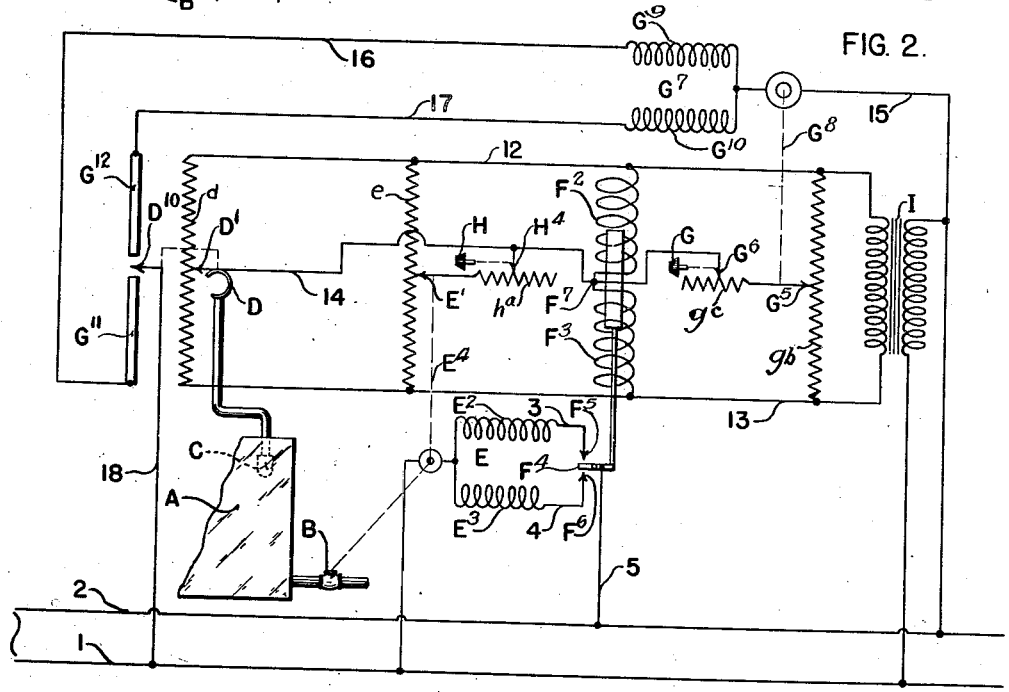
INVENTOR.
HARRY S. JONES
BY George M. Whurchamp
ATTORNEY June 24, 1941.  H. S. JONES  2,246,686
CONTROL SYSTEM
Filed Aug. 3, 1937  6 Sheets-Sheet 2
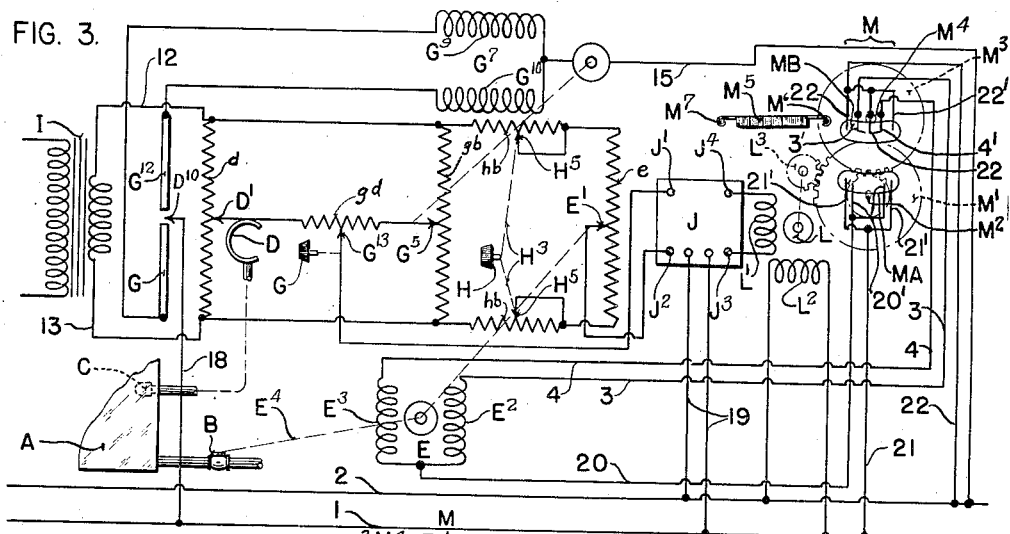
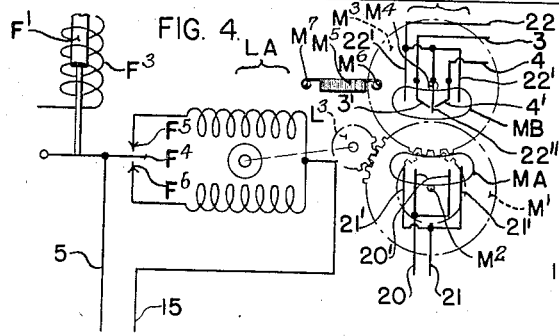
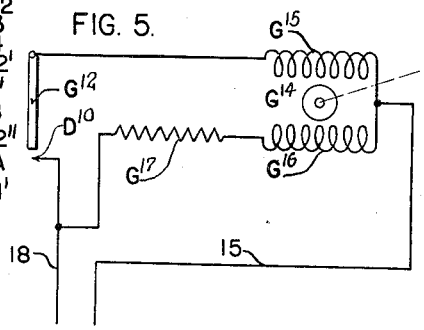
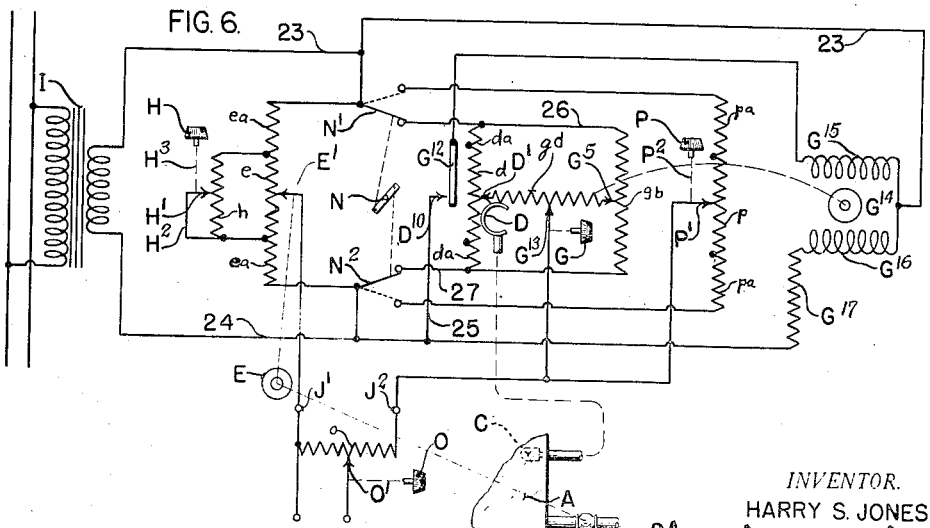
INVENTOR.
HARRY S. JONES
BY George H. Wunschauf
ATTORNEY June 24, 1941.   H. S. JONES   2,246,686
CONTROL SYSTEM
Filed Aug. 3, 1937   6 Sheets-Sheet 3

INVENTOR.
HARRY S. JONES
BY George M. Merchant
ATTORNEY

June 24, 1941.　　　H. S. JONES　　　2,246,686
CONTROL SYSTEM
Filed Aug. 3, 1937　　　6 Sheets-Sheet 4
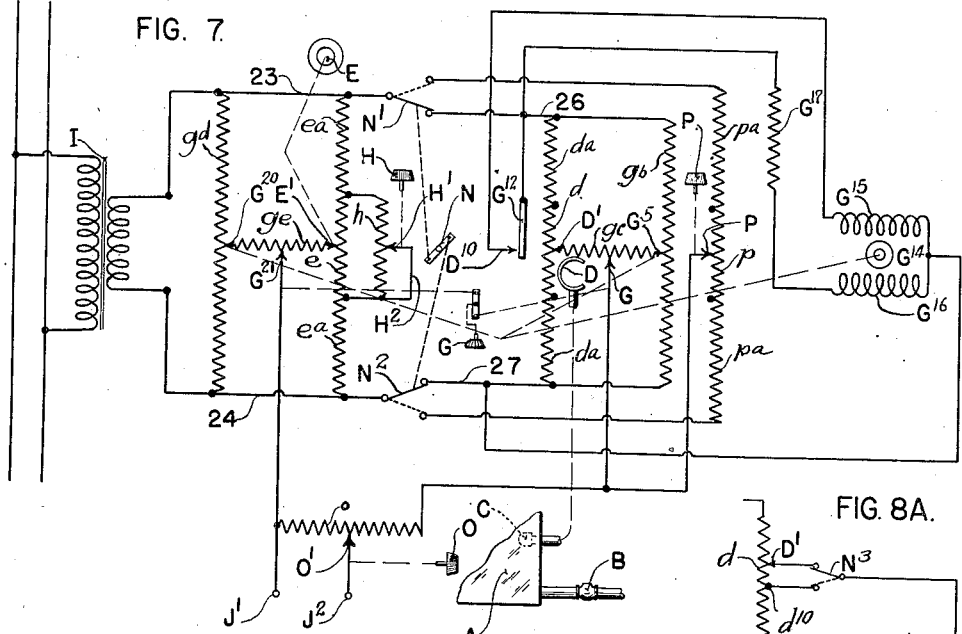
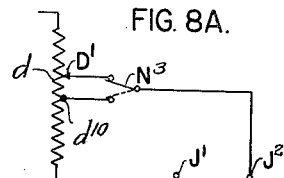
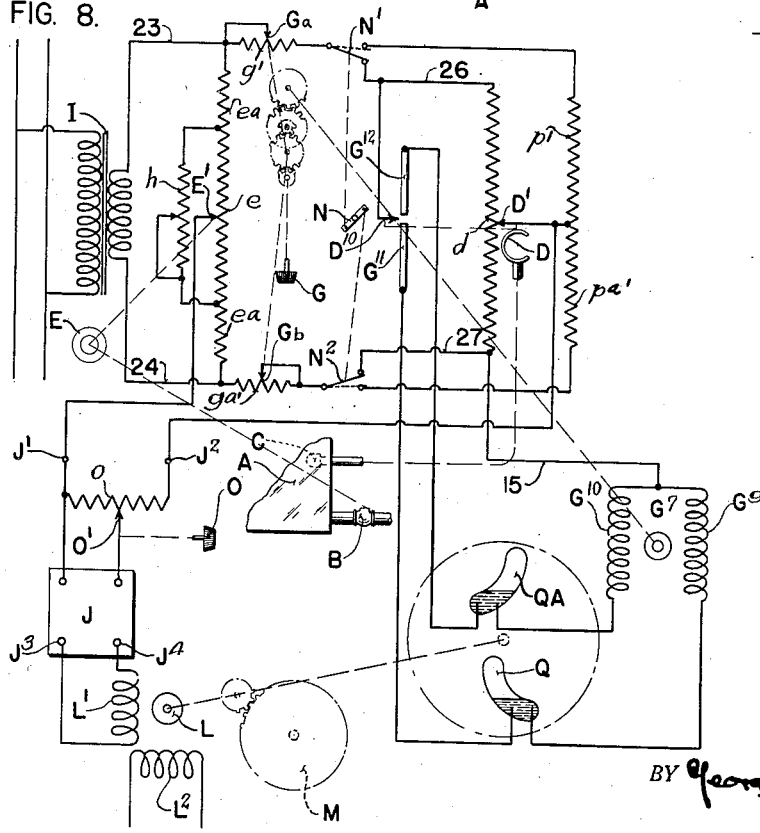
INVENTOR.
HARRY S. JONES
BY George M. Munselman
ATTORNEY

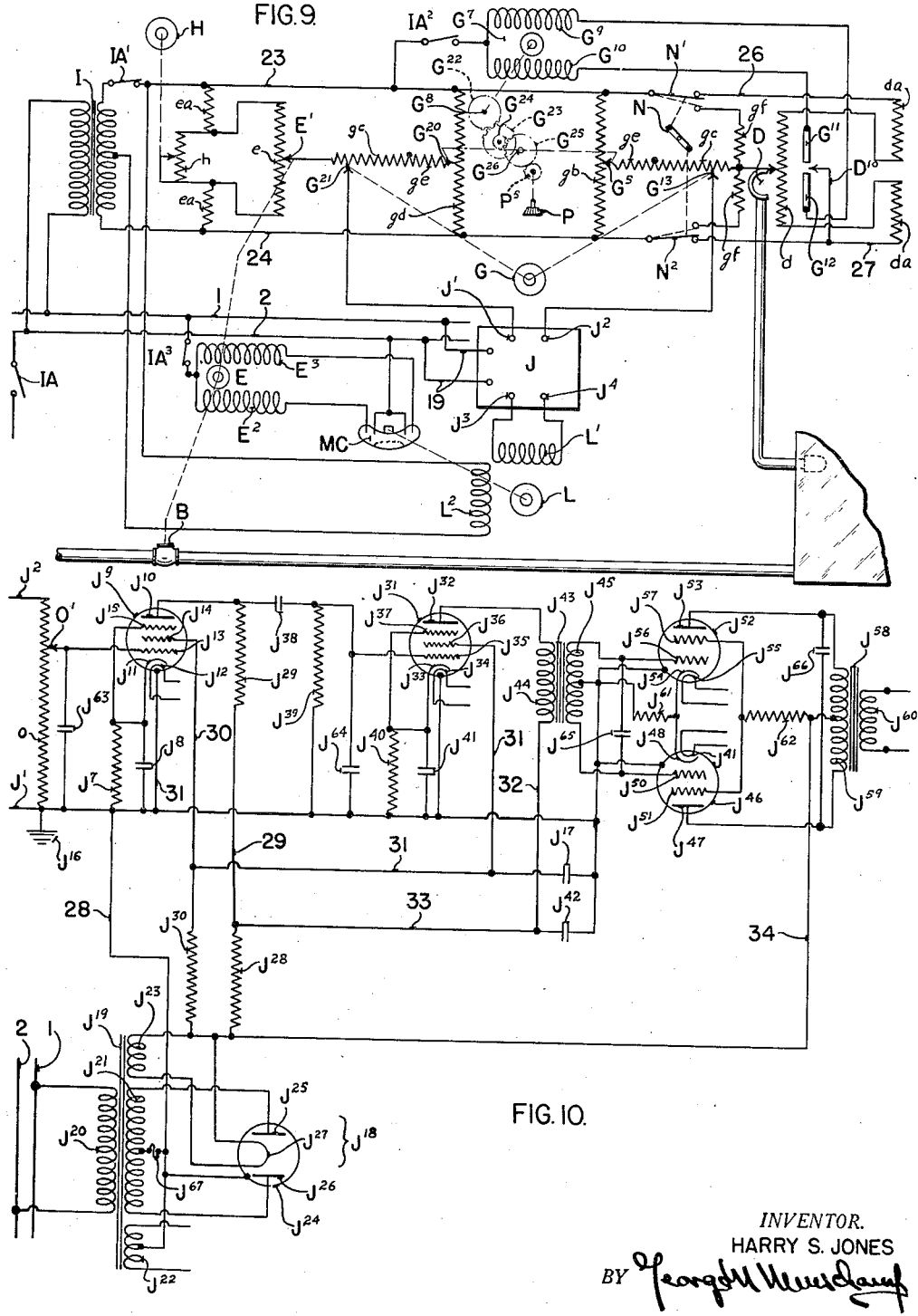

June 24, 1941.　　　H. S. JONES　　　2,246,686
CONTROL SYSTEM
Filed Aug. 3, 1937　　　6 Sheets-Sheet 6

INVENTOR.
HARRY S. JONES
BY George M. Meuschauf
ATTORNEY

Patented June 24, 1941

2,246,686

UNITED STATES PATENT OFFICE 2,246,686

CONTROL SYSTEM

Harry S. Jones, Philadelphia, Pa., assignor to The Brown Instrument Company, Philadelphia, Pa., a corporation of Pennsylvania Application August 3, 1937, Serial No. 157,084

36 Claims. (Cl. 172—239)

The general object of the present invention is to provide improved electrical control apparatus. More specifically, the object of the invention is to provide improved electrical control apparatus comprising a meter, which, in many cases, is advantageously a self-balancing potentiometer instrument, for measuring a controlling quantity or value, and for actuating a relay mechanism to effect corrective control adjustments in accordance with variations in the controlling quantity.

More specifically still, the object of the present invention is to provide electrical apparatus of the character above mentioned, with simple and effective means for adjusting it for desirable operation, under different conditions of use.

In a preferred form, the improved control apparatus includes a reversible electric motor automatically actuated to effect a so-called "reset" adjustment, whereby on a change in an operating condition, such, for example, as a change in the load on a furnace which is being controlled to minimize variations in a furnace temperature, the tendency of the furnace load or other operating condition change to decrease or increase the furnace temperature or other controlling condition may be neutralized.

The preferred form of invention also includes means for effecting an adjustment in the rate of reset adjustment, whereby on the change in furnace load, or analogous operating condition, the compensating adjustment necessary to the maintenance of the approximately constant value of the furnace temperature or other controlling quantity, may be varied, to the end that the time required for full compensation for the operating condition change, may be reduced to the practical minimum possible without risk of objectionable hunting.

In the preferred form of the invention, also, provisions are included for readily effecting a so-called throttling range adjustment, whereby the extent of adjustment to which the fuel valve or other regulator directly controlled is adjusted in response to a given change in the furnace temperature or other control quantity, may be varied.

In its preferred form, also, the control apparatus includes provisions for effecting a sensitivity adjustment whereby the adjustment steps of the valve or other regulator can be made as small as is practically possible without giving rise to hunting.

In its preferred form, also, the improved control apparatus includes means whereby the automatic reset action may be dispensed with, and the control instrument may be rendered temporarily inoperative to effect control actions, while the remainder of the control mechanism may be utilized in effecting manual control actions.

Some forms of the improved control apparatus are characterized by the thermionic amplifying means through which the instrument acts upon a relay motor. The invention is further characterized by improvements in automatic switches used in controlling the operation of the relay motor.

The invention comprises various novel proportioning control circuits.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Figs. 1, 2, and 3 are control circuit diagrams each illustrating a different form of the invention;

Fig. 4 illustrates a second modification of apparatus shown in Fig. 3;

Fig. 5 illustrates a modification of another portion of the apparatus shown in Fig. 3;

Figs. 6 and 7 are control circuit diagrams each illustrating a different form of the invention;

Fig. 8 is a diagrammatic representation of apparatus which may be used in conjunction with other apparatus shown in Figs. 6 and 7;

Figs. 8A and 8B are diagrams showing different modifications of the apparatus of Fig. 8;

Fig. 9 is a control circuit diagram illustrating still another form of the invention;

Fig. 10 is a diagram of thermionic amplifying means which may be used in various forms of the invention;

Figure 11:
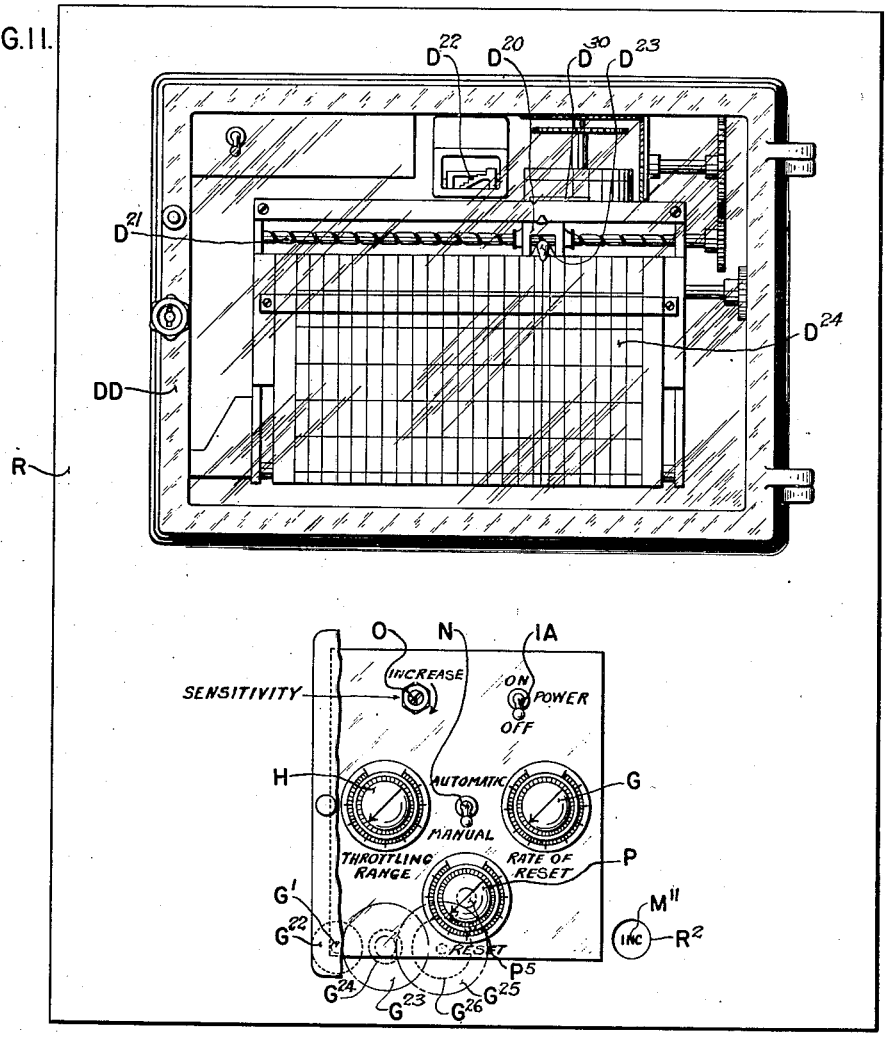
Fig. 11 is an elevation of a control panel in which a control instrument and associated control devices are mounted.

In the embodiment of the invention diagrammatically illustrated in Fig. 1, the fuel supply to a furnace A is regulated by the adjustment of a fuel supply valve B in automatic response to variations in a furnace temperature, as required to maintain that temperature approximately constant. The furnace temperature is measured by means shown diagrammatically as comprising the bulb C of a fluid pressure type thermometer, connected to a measuring instrument, including an actuating element in the form of an arc shaped Bourdon tube D to which the thermometer bulb pressure is transmitted. On an increase or decrease in the furnace temperature, the resultant flexure of the Bourdon tube D, moves a contact D' along a measuring instrument slide wire resistor $d$, up or down as seen in Fig. 1. The initial effect of any movement of the contact D', is to unbalance a normally balanced control circuit including the resistor $d$, and thereby to energize a reversible control motor E for operation in the direction to effect a corrective adjustment of the fuel valve B, and a corresponding circuit rebalancing adjustment of a contact E'. The motor E, as shown, operates in one direction or the other accordingly as one or the other of its two field windings $E^2$ and $E^3$ is energized. The armature shaft $E^4$ of the motor is operatively connected to the movable element of the fuel valve B and to the contact E', which is adjustable along a slide wire resistor $e$ included in the control circuit. The control circuit is energized by the connection of the contacts E' and D' to supply conductors 1 and 2.

As shown, the energization of the motor E is directly controlled by an electro-magnetic relay F comprising an armature F' movable axially in two end-to-end solenoid coils $F^2$ and $F^3$ included in the control circuit, to thereby adjust a motor energizing switch $F^4$. In the normal balanced condition of the control circuit, the strength of the current flow is the same in the two coils $F^2$ and $F^3$, and the armature F' has opposite end portions of the same length respectively received in the two coils $F^2$ and $F^3$, so that the two coils exert electro-magnetic pulls on the armature F', equal in magnitude, but opposite in direction. In that symmetrical, balanced position of the armature F', a pivoted switch member $F^4$ connected to the armature F', occupies an intermediate position in which it is between, and out of engagement with each of the switch contacts $F^5$ and $F^6$.

The switch member $F^4$ is tilted counter-clockwise on an increase in the furnace temperature, and resultant up movement of contact D', and thereby energizes the winding $E^2$ and causes the motor E to operate in the direction to increase the throttling effect of the valve B and to lower the contact $E^1$ and thereby rebalance the control circuit. The energizing circuit including the winding $E^2$ comprises the supply conductor 1, to which one terminal of each of the windings $E^2$ and $E^3$ is connected, a conductor 3 connecting the second terminal of the winding $E^2$ to the relay switch contact $F^6$, and a conductor 5 connecting the switch member $F^4$ to the supply conductor 2. Conversely, on a decrease in the furnace temperature and down movement of the contact D', the switch member $F^4$ tilts clockwise and completes a motor energizing circuit through the motor winding $E^3$ between the supply conductors 1 and 2. The last mentioned circuit comprises a supply conductor 1, the winding $E^3$, a conductor 4 connecting the second terminal of the winding $E^3$ to the relay switch contact $F^6$, and the conductor 5, which connects the switch $F^4$ to the supply conductor 2.

In the form of the control system shown in Fig. 1, with the adjustable contacts D' and E' respectively connected to the supply conductors 2 and 1, current flows in parallel through two branches of the control circuit. One of those branches includes the portion of the resistor $d$ above the contact D', the conductor 6 connecting the upper end of the resistance $d$ to the portion of a rheostat resistance $g$ between the conductor 6 and a rheostat contact G' engaging and adjustable along the resistance $g$, a conductor 8 connecting the contact G' to one terminal of relay coil $F^2$, a conductor 10 connecting the second terminal of the coil $F^2$ to the upper end of the resistor $e$, and the portion of the latter above the contact E'. The other branch of the control circuit includes portions of the resistor $d$ and $e$ below the contacts D' and E' respectively, the relay coil $F^3$, more or less of a rheostat resistance $ga$ engaged by a contact $G^2$ and conductors 7, 9, and 11, analogous in their circuit relations to the conductors 6, 8, and 10.

The resistances $g$ and $ga$ and contacts G' and $G^2$ may be regarded as forming parts of a single control point resetting device including a knob G, which may be manually rotated to thereby rotate a shaft connection $G^3$ between the knob G and the contacts G' and $G^2$. The rotation of the knob G in one direction or the other increases or decreases, depending on the direction of knob rotation, the amount of the resistance $g$ in circuit, and simultaneously and similarly decreases and increases the amount of the resistance $ga$ in circuit. The magnitude of the resistance in the control circuit is thus not varied by the adjustment of the reset device G, but the initial effect of that adjustment is to change the relative amounts of resistance in the parallel control circuit branches respectively including the two resistances. The ultimate effect of the resetting adjustment, is to change the positions of the contact E' and the throttling adjustment of the fuel valve B assumed when the control circuit is balanced with the bulb at its normal, or predetermined, temperature, and with the contact D' in its mid position.

As will be apparent to those skilled in the art, with the coils $F^2$ and $F^3$ similar to one another and adapted to exert similar but opposing effects on the armature F', the member $F^4$ can be maintained in its intermediate position, only when the control circuit is balanced, so that the currents through the coils $F^2$ and $F^3$ are equal. With the control circuit energized as described, this means that in the balanced condition, the impedance of each of the two branches of the control circuit must be the same. In consequence, any adjustment of the contact D' which initially increases the resistance in one and decreases the resistance in the other of the two branches of the control circuit, must result in a rebalancing adjustment of the contact E', increasing the amount of resistance in one of the two branch circuits as much as that amount was decreased by the initial adjustment of the contact D', and decreasing the amount of resistance in the second branch of the control circuit as much as the resistance in that branch was increased by the initial adjustment of the contact D'.

The apparatus shown in Fig. 1, includes means for effecting a control range adjustment, commonly referred to as a throttling range adjustment, particularly when the control element is a valve, such as the valve B. The throttling, or control, range adjustment, varies the extent of adjustment of the valve B produced by a given movement of the contact D' along the resistance d. The extent of the valve adjustment produced by a given change in adjustment of the contact D' depends upon the amount of adjustment of the contact E' along the resistor e required to rebalance the control system, when the latter is unbalanced by an initial change in position of the contact D'. In the form of the invention shown in Fig. 1, the throttling range adjustment is effected by varying the amount of the resistance $h$ which is included in a shunt to the resistance $e$. The resistance $h$ has its upper and lower ends connected to the conductors 10 and 11 respectively, and a conductor $H^2$ connects the conductor 11 to a contact H' engaging and adjustable along the resistance $h$. The contact H' may be so adjusted by the rotation of a throttling adjustment knob H, having a shaft connection $H^3$ with the contact H'. As will be apparent, the total potential drop in the resistance $e$ is increased and decreased by an increase and decrease respectively in the amount of the resistance $h$ effectively included in the shunt to the resistance $e$. The effect of a decrease in the potential drop in resistance $e$, is to increase the extent of the movement of the contact E' required to rebalance the control circuit when the latter has been unbalanced by an initial adjustment of given magnitude of the contact D. The throttling range of the apparatus shown in Fig. 1 is thus directly proportional to the potential drop in the resistance $e$.

The effect on the potential drop through the resistance $e$, of a throttling range adjustment of the resistance $h$ in circuit, is substantially directly proportional to the resistance of the connection between the conductors 10 and 11, collectively formed by the resistance $e$ and by the shunt including more or less of the resistance $h$. The relation between the unbalancing movement of the contact D' and the consequent rebalancing movement of the contact E', is linear for all throttling ranges, and for any given throttling range adjustment of the knob H, the sensitivity of the apparatus is substantially constant over the entire range of contact movement. The joint effect of the resistance $e$ and shunt resistance $h$ on the throttling range of the apparatus, is exactly the same as it would be if the resistances $e$ and $h$ were replaced by a single slide wire resistance having the same resistance, for any adjustment of the knob H, as does the actual connection between the conductors 10 and 11 formed by the resistor $e$ and resistance $h$.

Such throttling range and reset adjustments as are provided for in Fig. 1, can be obtained with control circuit arrangements quite different in form from that shown in Fig. 1. One such alternative control circuit arrangement is shown in Fig. 2, which also comprises means for automatically effecting resetting adjustments and thereby compensating for a change in furnace load or other condition which tends to vary the value of the controlling condition which the apparatus tends to maintain. In the control circuit shown in Fig. 2, the resistors $d$ and $e$ and the series connected relay coils $F^2$ and $F^3$, are connected in parallel between the terminal conductors 12 and 13 of the secondary winding of a transformer I, which has its primary winding connected between alternating supply conductors 1 and 2. A resistor $gb$, serving resetting purposes, as hereinafter explained, is also connected between the conductors 12 and 13.

The contact D' of Fig. 2 is connected by conductor 14 of negligible resistance to the point $F^7$ at which the relay coils $F^2$ and $F^3$ are connected to one another. The contact D' and the connection point $F^7$ each have a variable resistance connection with the adjustable contact E', formed by a resistance $ha$ connected at one end to the contact E' and engaged by a contact $H^4$ adjustable along the resistance $ha$ and connected to the conductor 14. The contact D' and connection point $F^7$ each have a variable resistance connection, also, with a contact $G^5$ engaging and adjustable along a resistance $gb$ connected between supply conductors 12 and 13, the said variable resistance connection including a resistance $gc$ connected at one end to the contact $G^5$ and engaged by a contact $G^6$ adjustable along the resistance $gc$ and connected to the point $F^7$.

In the arrangement shown in Fig. 2, the contact D' is adjusted by furnace temperature changes, and the contact E' and the fuel valve B are adjusted by a motor E in response to any change in the current flows through the coils $F^2$ and $F^3$, as in the arrangement shown in Fig. 1. In Fig. 2, the contact $H^4$ may be manually adjusted by a throttling range adjusting knob H, as the knob H of Fig. 1 adjusts the contact $H^1$ of that figure.

The control point resetting adjustments are effected in Fig. 2, by the adjustment of the contact $G^5$ along the resistance $gb$, automatically, following a change in the furnace temperature, by a reversible reset motor $G^7$. The latter has an armature shaft connection $G^8$ with the contact $G^5$, and is energized for operation in one direction or the other by the energization of one or the other of its field windings $G^9$ and $G^{10}$, each of which has one terminal connected through the motor armature and a conductor 15 to the supply conductor 2. The second terminal of the motor winding $G^9$ is connected to a contact $G^{11}$ by a conductor 16, and the second terminal of the motor winding $G^{10}$ is connected by a conductor 17 to a contact $G^{12}$. The contacts $G^{11}$ and $G^{12}$ are arranged end to end along different portions of the path of movement of a contact $D^{10}$. The latter is adjusted by the device D, and is connected by a conductor 18 to the supply conductor 1.

Whenever the contacts D' and $D^{10}$, which are similarly moved by the device D, are displaced upwardly from their normal or predetermined temperature positions, by an increase in the furnace temperature, the contact $D^{10}$ engages the contact $G^{12}$ and thereby energizes the motor winding $G^{10}$, with the result that the motor $G^7$ then operates in the direction to give an up adjustment to the contact $G^5$. Conversely, on a decrease in the furnace temperature below normal, the contact $D^{10}$ is moved down into engagement with the contact $G^{11}$, so that the motor winding $G^9$ is energized and the motor operates in the direction to give a down adjustment to the contact $G^5$. As hereinafter explained, the automatic adjustment of the contact $G^5$, results in a so-called compensating adjustment of the fuel valve B.

The initial effect of a furnace chamber temperature change, resulting in an adjustment of the contact D' of Fig. 2, is to unbalance the control circuit so as to create a difference between the strengths of the current flows in relay coils F² and F³. For example, an increase in furnace temperature and up adjustment of the contact D', increases the resistance to the flow of current between the contact D' and the conductor 13, through the path of flow formed by the lower portion of the resistor d, relative to the resistance of the path of flow including the conductor 14 and coil F³. This increases the current flow through the coil F³ relative to the current flow through the relay coil F², so that the switch F⁴ will tilt clockwise. This will energize the motor winding E² and cause the motor E to operate in the direction to give a closing adjustment to the fuel valve B and a down adjustment to the contact E'. The effect of the down adjustment of the contact E' is to decrease the resistance to the flow of current between the contact D' and the conductor 13, in the path of flow of such current including the conductor 14, the contact H⁴, resistance ha, and the portion of the resistor e between the contact E' and the conductor 13.

Stated differently, the effect of the initial up adjustment of the contact D' is to increase the potential difference between that contact and the conductor 13, and between the latter and the point F⁷, which is always at the same potential as the contact D'. This results in an increase in current flow through the relay coil F³, and the energization of the winding E² of motor E. The down adjustment of the contact E' produced by the resultant operation of the motor E, decreases the resistance of the shunt, including the portion of resistor e below contact E', about the portion of the resistor d between the contact D' and the conductor 13, and thus eliminates a portion of the increase in potential difference between contact D' and conductor 13, produced by the initial adjustment of D'. Such an automatic neutralization of a portion of an initial control adjustment is sometimes referred to as a follow-up action.

Assuming no other change in the circuit in the meantime, the motor E would continue its closing adjustment of the valve B and down adjustment of the contact E', until the circuit is so rebalanced that the current flow through the relay coil F³ is again equal to the current flow through the relay coil F², which means that the common potential of the contacts D' and point F⁷ would again be midway between the potentials of the conductors 12 and 13.

In that condition of the apparatus, the current flows through the coils F² and F³ must be equal, but the current flows through the portions of resistor d above contact D' is necessarily greater than the current flow through the portion of resistor d below contact D'. As will be apparent, this condition exists, because there is a current flow between D' and conductor 13, which creates a potential drop in the portion of the resistance ha, as well as in the portion of the resistance e below contact E'.

The magnitude of the adjustment of the contact E' directly resulting from the adjustment of the contact D', thus depends upon the position of the contact H⁴ along the resistance ha. The throttling range of the apparatus shown in Fig. 2 is thus increased and decreased by adjusting the contact H⁴ to the left or right respectively as seen in Fig. 2.

If the initial up adjustment of the contact D' resulted from an increase in furnace temperature produced by reduction in the furnace load, which thereafter remains constant for a time, the above described partial closing adjustment of the fuel valve B would not return the furnace temperature to its normal value, but would tend to maintain it at a definitely higher value. For the return of the furnace temperature approximately to its normal value, following a furnace load decrease, a further compensating or resetting adjustment of the fuel valve B is required.

Such a compensating adjustment is effected in the control system of Fig. 2, by means including the contact G⁵, and the means for adjusting it. As previously explained, on an increase in the furnace temperature moving the contact D¹⁰ into engagement with the contact G¹², the motor G⁷ operates to give an up adjustment of the contact G⁵. This increases the potential of the point F⁷, and results in a second additional down adjustment of the contact E', subsequent to that produced, as above described, as a direct result of the increase in the potential difference between D' and 13. The net result of this automatic adjustment of the contact G⁵, is thus to increase the closing adjustment of the fuel valve B produced by the initial rise in the furnace temperature. Furthermore, the adjustment of the contact G⁵ will continue until there is a reverse change in the furnace temperature sufficient to return the contacts D' and D¹⁰ to their normal mid-positions. Adjustments of the apparatus of Fig. 2, which are the converse of those above described, will occur when the furnace temperature falls below its normal or predetermined value.

The adjustment effected by the motor G⁷ of Fig. 2, is a true compensating adjustment, making it possible to maintain approximately the same furnace temperature notwithstanding such changes in the furnace loads, for example, as may result from substantial changes in amount of material heated in the furnace. In a governing or control system of the general character shown in Fig. 2, the rate at which compensating adjustments are effected, must be suitably related to the constants, and particularly to the time lag constant of the apparatus or process controlled, if objectionable hunting is to be avoided.

In the arrangement shown in Fig. 2, the rate at which the reset or compensating control action of the motor G⁷ is effected may be adjusted manually by means of a knob G such as is employed in Fig. 1, to effect the reset control action. In Fig. 2, the effect of an adjustment of the contact G⁵ on the potential of point F⁷, and position of contact E', depends upon the amount of resistance gc in circuit between the contact G⁵ and the connection point F⁷, and can be increased or decreased by operation of the knob G to adjust the contact G⁶ to the right or left as seen in Fig. 2, along the resistance gc. In consequence, the extent of operation of the reset motor G⁷, and therefore the length of the time period required to effect the compensating adjustment of the contact E' and valve B which will be sufficient to return the furnace temperature to the predetermined value, following a change in furnace load, depends upon and may be varied by varying the adjustment of the contact G⁶.

As will be understood also, the speed characteristic of the reset motor $G^7$, and the ratio of reset motor motion to motion of contact $G^5$, should be chosen so as to be suitable for an average or normal full compensating period which varies with the character of the operation controlled. For example, it may be five minutes with one furnace, and twenty minutes with another. In general, the operation of the valve motor E directly due to the adjustment of contact D' will be effected much more quickly than that directly due to the adjustment of contact $G^5$.

In Figure 3, I have illustrated a control circuit arrangement including resistors $d$ and $gb$ energized by a transformer I, and including a reset motor $G^7$ associated with contacts $G^{11}$, $G^{12}$, and $D^{10}$, as in the arrangement shown in Fig. 2. The secondary of the transformer I has its terminals directly connected to the terminals of the instrument resistor $d$, and the reset resistor $gb$ and has each of its terminals connected to the corresponding terminals of the balancing resistor $e$ through a corresponding variable resistance $hb$. Associated with each resistance $hb$ is a contact $H^5$, which engages and is adjustable along the length of the resistance. The two contacts $H^5$ are adapted for similar simultaneous adjustments through shaft connections $H^3$ to a throttling range adjustment knob H.

The solenoid coil controller and associated switch mechanism employed in Figs. 1 and 2, to control the relay motor E, is replaced in Fig. 3, by control means including a switch mechanism M, a reversible switch actuating electric motor L, and an electronic amplifying device J. The latter makes the operation of the motor L dependent on a change in the relative potentials of points in the control circuit network, which have their relative potentials changed by a change in position of the contact D' and change in the reverse direction by the adjustments of contacts E' and $G^5$, resulting from the change in position of the contact D'. In Fig. 3, the contact D' is connected to the contact $G^5$ through a resistance $gd$, and one input terminal J' of the amplifier is connected to a contact $G^{13}$ engaging and adjustable along the length of the resistance $gd$. The second amplifier input terminal $J^2$ is connected to the contact E'.

As is plainly apparent, an increase or decrease in the portions of the resistance $hb$ in circuit will change the relative amounts of potential drop in the resistor $e$. That change in relative potential drops constitutes a throttling range adjustment, since it means that on a given extent of initial adjustment of the contact D', the extent of adjustment of the contact E' required to rebalance the control circuit is increased, or decreased.

The general character of the operation of the apparatus shown in Fig. 3 will be apparent from the immediately following description of the actions occurring when the furnace load is decreased, and then remains constant at its new value, for a period long enough for the control system to establish the stable operating conditions required for the maintenance of the normal furnace temperature with the new furnace load. The first effect of the furnace load decrease is an increase in furnace temperature and up movements of the contacts D' and $D^{10}$. The up movement of the contact D' results in a change in the relative potentials of the contacts D' and $G^5$, thereby creating a potential difference between contacts E' and $G^{13}$. That potential difference causes the motor E to start into operation in the direction to give a closing adjustment to the fuel valve B and an up adjustment to the contact E'. The last mentioned adjustment tends to eliminate the potential difference between the contacts E' and $G^{13}$.

On its up movement resulting from the furnace temperature increase, the contact $D^{10}$ engages the contact $G^{12}$, and thereby starts the motor $G^7$ into operation in the direction to raise the contact $G^5$. The raising of the contact $G^5$ tends to create a potential difference between the contacts E' and $G^{13}$ in the same direction as that created by the initial up adjustment of the contact D', and results, therefore, in operation of the motor E in the direction to give a further up adjustment to the contact E', and a further or compensating or reset adjustment of the valve B in the closing direction.

The compensating adjustment of the valve B will continue until the contacts D' and $D^{10}$ are returning to their normal mid positions. When the system is thus stabilized, the contacts E' and $G^5$ will be in their respective mid positions only for some one particular furnace load, which may be regarded as the normal load for the prevailing calibration of the control system. If the actual furnace load for which the control system is stabilized exceeds or is less than said normal load, the contacts $G^5$ and E' will be above or below their respective mid positions. In the stabilized condition of the apparatus, the position of the contact E' must correspond to the particular adjustment of the fuel valve B required for the maintenance of the normal furnace temperature with the prevailing furnace load, and the corresponding position of the contact $G^5$ must be such, therefore, as to equalize the potentials of the contacts E' and $G^{13}$. With the contact D' in, and the contact $G^5$ out of, its mid position, there will be current flow through the resistance $gd$, and the potential of the contact $G^{13}$, if intermediate the ends of the resistance $gd$, will depend jointly on the position of that contact along the resistance $gd$, and on the displacement of the contact $G^5$ from its mid position, since that displacement determines the magnitude of the current flow through the resistance $gd$.

In the extreme condition in which the contact $G^{13}$ is at one end or the other of the resistance $gd$, the potential of $G^{13}$ will be either the same as that of contact D' or as that of the contact $G^5$. In the first case, there can be no compensating or reset action, and in the second case, the motors E and $G^7$ will tend to slowly effect an on and off control.

An adjustment of the contact $G^{13}$, from one intermediate position to another along the resistance $gd$, which may be effected manually by means of the knob G, varies the extent of displacement of the contact $G^5$ which is required to stabilize the control system, following any change in the furnace load. Since the reset or compensating motor $G^7$ adjusts the contact $G^5$ but slowly, any adjustment of the contact $G^{13}$ by increasing or decreasing the extent of movement of contact $G^5$ required for a given compensating adjustment, increases or decreases the time required to effect that adjustment.

The resistance $gd$ is advantageously made large relative to the resistances of the instrument and reset resistors $d$ and $gb$. Advantageously, also, the apparatus is so arranged that current flow through the amplifier J or other device responsive to the relative potential of the contacts E' and G$^{13}$ is too small to have any direct effect on current and potential conditions in the control network. In practice, this result is insured by the use of an amplifier J, which so far as concerns its direct effect on control network conditions, behaves like a phase sensitive A. C. galvanometer of ten or more times the resistance of the maximum resistance in the control network.

The amplifying unit J has power conductor connections 19 with the supply conductors 1 and 2, and has its output terminals J$^3$ and J$^4$ connected to the terminals of one winding L' of the motor L. The latter as shown, is of a known type, adapted, when current flows through the winding L', to operate in one direction or the other, accordingly as that current flow lags or leads the current flow in a second winding L$^2$ of the motor, which has its terminals connected to the supply conductors 1 and 2.

The proper phase difference in the current supply to the field windings L' and L$^2$ is obtained by means of the amplifier J which introduces a phase shift of nearly 90° in the current which it amplifies, as will be explained hereinafter. In consequence, the current flow in the winding L' will lead or lag by nearly 90° the current in the winding L$^2$, accordingly as the potential of one or the other of the contacts E' and G$^{13}$ is the higher. Therefore, an up adjustment of either contact D' or G$^5$ will result in operation of the motor L in one direction, and the motor may operate in the opposite direction in response to a down adjustment of either contact D', or G$^5$.

As will be readily apparent from Figs. 3–9, the motor L may be adapted to directly control the contact E' as well as the valve B without the interposition of the relay motor E and the associated circuits for energizing the latter. When so arranged, the circuit rebalancing operation in response to circuit unbalance resulting from condition changes, compensating or reset adjustments, and/or throttling range or reset adjustments, will be precisely the same as hereinbefore described.

The switch mechanism M through which the motor L controls the reversible relay motor E may take various forms, but in some cases is advantageously adapted to prevent coasting of the relay motor E, by subjecting the latter to a positive braking or stop action, as soon as the switch mechanism M is adjusted to interrupt the energization of the motor. The elimination of, or reduction in motor coasting, is of considerable practical importance, particularly in the case of a relatively large relay motor. The switch mechanism M shown in Fig. 3, and on a larger scale in Fig. 4, comprises a switch carrier M' rotatable about a shaft M$^2$ and rotated by a gear L$^3$ carried by the shaft of the motor L. The disc M' supports a mercury switch MA, which connects one terminal of each of the windings E$^2$ and E$^3$ of the motor E to, or disconnects said terminal from the supply conductor 1, accordingly as the switch MA is out of, or in its horizontal position, shown in Fig. 3. To this end, one terminal of each of the windings E$^2$ and E$^3$ is connected by a conductor 20 to two switch contacts 20' extending into the container of the switch MA, one adjacent each end of the latter. A conductor 21 connects the supply conductor 1 to two switch contacts 21', which extend into the container of the switch MA, one adjacent each end of the latter.

As shown, the disc M' is gear connected to a second switch carrying disc M$^3$ rotatable about a pivot shaft M$^4$, the gear connection being such that the angular movement of the disc M$^3$ is appreciably smaller than that of the disc M' by which it is produced. The disc M$^3$ carries a mercury switch MB, into the container of which five switch contacts extend. Those contacts comprise a central contact 22", and two end contacts 22', one at each side of the contact 22". The contact 22" and the two contacts 22' are connected by a conductor 22 to the supply conductor 2. The other two contacts 3' and 4' are located at opposite sides of the contact 22". The contacts 3' and 4' are connected by the conductors 3 and 4, respectively, to the terminals of the motor windings E$^2$ and E$^3$ not connected to the conductor 20.

The switch mechanism M is biased for return into a neutral or normal position, in which the containers of both switches MA and MB are horizontal, when the energization of the control motor L is interrupted following its operation in either direction. As diagrammatically shown, the biasing means comprises a spring M$^5$ connecting a pin M$^6$ carried by the disc M$^3$ to a stationary anchorage M$^7$. The spring M$^5$ is under tension and the parts M$^6$ and M$^7$ are so arranged that when the motor L is deenergized, the spring M$^5$ will return the disc M$^3$ to, and hold it in the angular position shown in Figs. 3 and 4.

In the operation of the apparatus shown in Fig. 3, on an energization of the motor L for operation in either direction, a small initial movement of the motor gives sufficient angular movement to the switch MA to connect the conductors 20 and 21, without giving sufficient movement to the switch MB to interrupt the normal connection of the contact 22" with each of the contacts 3' and 4'. In consequence, the said initial movement of the motor L energizes both windings E$^2$ and E$^3$, so that each neutralizes the tendency of the other to start the motor E into rotation. As the movement of the motor L continues, the further movement given the switch MB results in breaking the connection between contact 22" and one or the other of the contacts 3' or 4'. When the motion of the motor L is clockwise, for example, it eventually interrupts the connection between the contact 22" and the contact 3', and thereby deenergizes the motor winding E$^2$, whereupon the motor winding E$^3$ effects rotation of the motor E in one direction. Rotation of the motor E in the opposite direction, occurs when unbalance in the control circuit network produces a counterclockwise rotation of the motor L, and a movement of the switch MB in the direction to interrupt connection between the central contact 22" and the contact 4', thereby deenergizing the winding E$^3$.

As soon as the motor L is deenergized, or its energizing force is sufficiently reduced, the switch mechanism M is returned to its normal or neutral position by the action of the spring M$^5$. In the course of the switch mechanism return, the switch MB is adjusted into the position in which its contact 22" is connected to both of the contacts 3' and 4', before the movement of the switch MA is sufficient to interrupt connection between the conductors 20 and 21. In consequence, both motor windings E$^2$ and E$^3$ are energized during a portion of the time required for the return of the switch mechanism. This subjects the motor E to an electromagnetic braking or stalling action, effectively opposing coasting movement of the motor.

As will be apparent, the motor actuated mercury switch mechanism M may be adjusted or controlled by means other than the amplifier controlled motor L shown in Fig. 3. For example, as shown in Fig. 4, the switch mechanism M may be actuated by a reversible motor LA, which is controlled by a relay switch $F^4$, adjusted and controlling the motor LA, as the switch $F^4$ of Fig. 2 is adjusted and controls the operation of the motor E.

In lieu of the resetting or compensating motor $G^7$ and control provisions therefor shown in Figs. 2 and 3, I may make use of other forms of a reversible electric motor and appropriate control provisions therefor. For example, I may use in lieu of the motor $G^7$, the motor $G^{14}$ shown in Fig. 5. The latter comprises field windings $G^{15}$ and $G^{16}$, corresponding generally to the windings $G^9$ and $G^{10}$ of the motor $G^7$, and each having one terminal connected to the supply conductor branch 15. The other terminal of the winding $G^{15}$ is connected to a contact $G^{12}$ as in Figs. 2 and 3. The second terminal of the winding $G^{16}$ is permanently connected, however, to the branch 18 of the second supply conductor. The winding $G^{16}$ which is energized at all times, has a smaller motor energizing effect than does the winding $G^{15}$. As shown the windings $G^{15}$ and $G^{16}$ are alike, but the effect of the winding $G^{16}$ is reduced by the series resistance $G^{17}$.

The winding $G^{16}$ effects motor operation in one direction whenever the contact $D^{10}$ is below and out of engagement with the contact $G^{12}$. When the contact $D^{10}$ engages the contact $D^{12}$ and thereby energizes the winding $G^{15}$, the motor energizing effect of the latter overpowers that of the winding $G^{16}$, and reverses the operation of the motor $G^{14}$. With the reset motor $G^{14}$ energized as described, it is possible to effect a very sharp change in the direction of reset motor rotation, when the contacts D' and $D^{10}$ move from one side to the other of their neutral, or normal control point, positions. With the reset motor energized as shown in Fig. 5, the control circuit is continuously resetting itself at all times, the magnitude and rate of reset being determined by the position of the contact $G^{13}$ or other reset adjustment contact.

The control system shown in Fig. 6 is adapted for use as an automatic control system operating in a manner generally like or analogous to that of the systems previously described or, alternatively, for the use of some of its parts in manual control operations, wherein the motor E is automatically actuated to give the fuel valve B an adjustment corresponding to the setting or position of a manually adjustable control element.

Whether the control system of Figure 6 is in condition to act as an automatic control system, or as a manually controlled system, depends upon whether switch blades N' and $N^2$ are in their full line or dotted line positions, respectively. The switch blades N' and $N^2$ form parts of a double pole switch N including a switch lever which is adjustable to move the switch blades N', $N^2$ between their full and dotted line positions. With the switch blades N' and $N^2$ in their full line positions, the control system of Fig. 6 is quite similar to the system of Fig. 3, though it differs from the latter in the form of the means provided for throttling range adjustments, and by the inclusion of means comprising a potentiometer resistor $o$, for effecting sensitivity adjustments, and in that it includes a reset motor $G^{14}$ and associated control provisions arranged as shown in Fig. 5. In Fig. 6, also, the reset motor windings $G^{15}$ and $G^{16}$ are each connected at one end to one terminal 23 of the secondary of the circuit energizing transformer I, while the contact $D^{10}$ is connected by a conductor 25 to the other terminal 24.

The control, or throttling, range adjustment of Fig. 6, is of the character shown in Fig. 1, comprising a resistance $h$ in shunt to the valve motor resistor $e$ and parts H, H', and $H^2$ for cutting more or less of the resistance $h$ out of circuit. As shown, each end of the resistor $e$ is connected to the corresponding transformer terminal, 23 or 24, through a fixed resistor $ea$. The switch blades N' and $N^2$ are at all times connected to the transformer terminals 23 and 24, respectively. The switch terminal engaged by the blade N' in its full line position, is connected by a conductor 26 and resistor $da$ to one end of the resistor $d$, and by conductor 26 to one end of resistor $gb$. In its full line position switch blade $N^2$ is similarly connected by a conductor 27 to the second end of resistor $gb$, and through a second fixed resistor $da$ to the second end of the resistor $d$. The use of the fixed resistors $ea$ and $da$ contributes to increase in throttling, or control, range adjustment, and in the range of resetting, or compensating adjustment.

The sensitivity adjustment resistor $o$ of Fig. 6 is connected between the contacts E' and $G^{13}$ and as illustrated in Figs. 9 and 10 this resistor may be included in the amplifier J. One end of the resistor is connected to the terminal J' of the amplifier and the other end is connected to the terminal $J^2$, and a contact O' engaging and adjustable along the length of the resistor $o$ is provided for adjusting the portion of the potential difference between the contacts E' and $G^{13}$ to be amplified. The contact O' may be manually adjusted by a rotatable knob O. The device J may control the adjustment of the contacts E' and valve B, through a control motor L and relay motor E as in Fig. 3.

As will be apparent, the voltage impressed on the amplifier J or other responsive device of Fig. 6, is a fraction or percentage of the potential difference between the contacts E' and $G^{13}$, which can be varied by adjustment of the contact O' along the resistor $o$. The sensitivity adjustment thus provided, permits of regulation of the control system to effect adjustments of the valve B or analogous control device in steps which are as fine or small as is possible with the associated regulating mechanism, without giving rise to the objectionable hunting tendency, which is inevitable when the regulation is too fine or close. Such a hunting tendency is increased by any slight coasting or over travel permitted in the control relay motor serving the general purposes of applicant's motor E or in other moving parts of the system.

When the switch blades N' and $N^2$ of Fig. 6 are adjusted into their dotted line positions, the resistors $d$ and $gb$ are deenergized, and each of the switch blades N' and $N^2$ is then connected to a corresponding end of a manual control, resistor $p$, through a fixed resistor $pa$. Thus with the switch blades N' and $N^2$ in their dotted line, manual control positions, the resistor $p$ is then connected in series with the two fixed resistors $pa$ between the transformer terminals 23 and 24, in parallel with the instrument resistances comprising the balancing resistor $e$, and the two fixed resistors $ea$ connected to the ends of the resistor $e$. The end of the sensitivity adjustment resistor $o$ connected to the contact $G^{13}$, is also connected to a contact $P'$ engaging and adjustable along a knob $P$ having an operating connection $P^2$ with the contact $P'$.

With the switch blades $N'$ and $N^2$ in their position shown in dotted lines in Fig. 6, the control apparatus will automatically energize the motor E as required to make the potential of the contact $E'$ the same as the potential of the contact $P'$, regardless of the position into which the latter is manually adjusted. When the adjustment position of the contact $P'$ is changed, the apparatus operates automatically to produce a corresponding change in position of the contact $E'$.

As those skilled in the art will understand, it is particularly desirable to be able to shift quickly and easily from a normal automatic control to a manual control, for various purposes and operation periods. Thus manual control is frequently desirable in starting up and closing down operations, and as a result of emergency or other sudden or radial changes in operating conditions. The arrangement shown in Fig. 6 permits of a quick and easy change in either direction between automatic and manual control, and permits of effective use in manual control, of features, such as the sensitivity adjustment device of Fig. 6, and the apparatus controlled or adjusted by and through the amplifier J.

The control system shown in Fig. 7 is quite similar to that shown in Fig. 6, but differs from the latter in that it includes provisions for a dual reset control action and reset rate adjustment. The rest motor $G^{14}$ of Fig. 7, when adjusting the contact $G^5$ along the resistor $gb$, simultaneously adjusts a contact $G^{20}$ along a resistor $gd$, connected between the transformer secondary terminal conductors 23 and 24. The contact $G^{20}$ is connected to the contact $E'$ by a resistor $ge$. A contact $G^{21}$ engaging and adjustable along the resistor $ge$ is connected to the terminal of the potentiometer resistance $o$, which in Fig. 6 is connected to the contact $E'$. The operating connection between the motor $G^{14}$ and the contacts $G^5$, and $G^{20}$ are such, that the movement given the contacts $G^{20}$ and $G^5$ are in opposite directions. The practical effect of this is to make it possible to double the resistance and reset adjustment effect produced by a given movement of the reset motor $G^{14}$.

Fig. 7 also includes provisions whereby a rotation of the reset rate adjustment knob $G$ of Fig. 7 adjusting the contact $G^{13}$ to the right or left, correspondingly adjusts the contact $G^{21}$ to the left or right, respectively. This permits of a total reset adjustment effect which is approximately double that obtainable by adjusting the contact $G^{13}$ only.

The circuit of Fig. 7 differs from that of Fig. 6, in form in that the connections of the contacts $D^{10}$ and $G^{12}$ with the winding $G^{15}$ and resistance $G^{17}$ are interchanged. Fig. 7 differs from Fig. 6, in having its reset motor resistance $G^{17}$ and contact $G^{12}$ connected to the conductor 26 by which the resistors $gb$ and $d$ are connected to the switch blade $N'$, when the latter is in its full line position. Thus the reset motor $G^{14}$ of Fig. 7 cannot be energized when the switch blades $N'$ and $N^2$ are in their dotted line, manual control positions, while with the Fig. 6 arrangement, the reset motor may operate, though idly and possibly with an undesirable effect, when the switch blades $N'$ and $N^2$ are in their dotted line positions.

Fig. 8 illustrates a modification of the apparatus shown in Fig. 7, providing an anticipatory control effect which minimizes the tendency or risk of the furnace temperature or the other control quantity to overshoot the normal value thereof, as a result of a corrective control action which has reversed a previous departure of the control quantity from its normal value. To this end, the circuit arrangement of Fig. 8 includes provisions whereby the rset motor $G^7$ is operative to effect its reset, or compensating, control action, when the control quantity is departing from its normal value or is constant at a value different from its normal value, but preventing operation of the motor $G^7$ when the control quantity is approaching its normal value.

To this end, the reset motor $G^7$ of Fig. 8 has its field windings $G^9$ and $G^{10}$ connected to contacts $G^{11}$ and $G^{12}$ through mercury switches Q and QA respectively, the second terminals of the windings $G^9$ and $G^{10}$ being connected through conductor 15 to conductor 27, and the contact $D^{10}$ being connected to the conductor 26. The switches Q and QA are operatively connected to the shaft of the reversible control motor L, so that the movement of the latter out of its neutral position produced by an increase in the value of the controlling quantity opens the switch Q, and closes the switch QA, while movement of the motor L out of its neutral position in the opposite direction opens the switch QA, and closes the switch Q. In the neutral position of the armature L, the switches Q and QA are both closed.

With the control quantity above its normal value, the motor $G^7$ is energized through contacts $D^{10}$ and $G^{12}$, and switch QA, only if the latter is closed. In consequence, the reset motor $G^7$ can operate when the control quantity is above normal value, only if the control quantity is stationary or increasing. When the control quantity is decreasing, the motor L will turn to operate the control motor E (not shown in Fig. 8), to check the control quantity decrease, the switch QA will be open and the reset motor will be inoperative. Similarly, when the control quantity is below normal, the motor $G^7$ can operate only during periods in which the control quantity is stationary, or is decreasing, since when the control quantity is increasing, the resultant displacement of the motor L from its neutral position opens the switch Q.

The control system illustrated in Fig. 8 also includes provisions whereby manual reset may be effected whether the system is in condition to act under full automatic control, or as a manually controlled system. As illustrated a resistor $g'$ is inserted between the conductor 23 and $N'$ and a similar resistor $ga'$ is inserted between the conductor 24 and $N^2$. A rheostat contact $Ga$ engaging and adjustable along the resistor $g'$ is provided for adjusting the effective portion of this resistor in circuit and a rheostat contact $Gb$ engaging and adjustable along resistor $ga'$ is provided for changing the effective portion of this resistor in circuit. The resistors $g'$ and $ga'$ correspond generally to the resistors $g$ and $ga$ of the Fig. 1 arrangement and may be regarded as forming parts of a control point resetting device which may be adjusted by a knob G or the reset motor $G^7$.

The arrangement illustrated for obtaining such alternative manual or automatic adjustments will be described in detail hereinafter in connection with Fig. 9, and for the present purposes it is noted that the arrangement includes frictional engaging means whereby the knob G may be rotated to effect adjustment of the resistors $g'$ and $ga'$ independently of the reset motor $G^7$ even while the system is in condition to act as an automatically controlled system, and when the motor $G^7$ is effective to cause adjustment of the resistors $g'$ and $ga'$, the knob G is rotated idly.

As shown the terminals of the secondary winding of the transformer I are directly connected to the terminals of the balancing resistor $e$ through a corresponding resistor $ea$, and are connected through the adjustable resistors $g'$ and $ga'$ to the switch blades $N'$ and $N^2$. Thus, when the switch blades are in their full line positions the transformer secondary terminals will be connected to the terminals of the instrument resistor $d$ through the resistors $g'$ and $ga'$. When the switch blades are adjusted to their dotted line positions for manual control, they operatively disconnect the resistor $d$ from the control circuit and operatively connect into the latter two fixed resistors $p'$ and $pa'$, which are connected in series between switch blades $N'$ and $N^2$. Since the resistors $g'$ and $ga'$ are thus included in the control circuit with the system adjusted for either manual or automatic control, the control system may be manually reset to the control point at any time regardless of whether the system is adjusted for automatic or manual control.

The resistors $p'$ and $pa'$ are of equal magnitude and, as illustrated, their adjacent ends are connected to one another and to the instrument contact $D'$. The purpose of these resistors is to provide what in effect is a potentiometer resistance, whereby when the apparatus is adjusted for manual control, the instrument contact $D'$ will be maintained at the same potential as it would have in normal automatic control when in its mid or normal value position. With the arrangement of Fig. 8 the contact $D'$ may be connected to one input terminal $J^2$ of the amplifier and the second amplifier input terminal $J'$ may be connected to the contact $E'$.

In Fig. 8A I have illustrated, more or less diagrammatically, a further modification of a portion of the Fig. 8 arrangement in which the switch blades $N'$ and $N^2$ and the potentiometer resistors $p'$ and $pa'$ may be dispensed with, thereby effecting a material reduction in the apparatus involved. As illustrated, with this arrangement the terminals of the instrument resistor $d$ are adapted to be permanently connected to the terminals of the secondary winding of the transformer I through corresponding resistors $g'$ and $ga'$, and a switch blade $N^3$ is provided for adjusting the system for automatic or manual control. The switch blade $N^3$ is connected to one terminal $J^2$ of the amplifier J and in its full line position is directly connected to the instrument contact $D'$. When adjusted to its dotted line position the contact $N^3$ operatively disconnects the contact $D'$ from the control circuit and operatively connects the amplifier terminal $J^2$ to a center tap $d^{10}$ on the instrument resistor $d$, and thus operates to maintain the amplifier terminal $J^2$ at the potential it would have if the system were adjusted for automatic control and the instrument contact $D'$ were in its mid position. A similar arrangement may be incorporated in Fig. 3, for example, in which the connection between contact $D'$ and resistor $gd$ may be arranged to be connected alternately to contact $D'$ and the mid point of resistor $d$.

To obtain the general advantage of the Fig. 8 arrangement with moderate displacements of the control quantity from its normal value, while obtaining the full reset motor operation effect when the control value is more widely displaced from its normal value, use may be made of the arrangement shown in Fig. 8B. That arrangement differs from the Fig. 8 arrangement only by the addition of a contact $G^{12'}$ above the contact $G^{12}$, and of a contact $G^{11'}$ below the contact $G^{11}$. The contact $G^{12}$ is connected to the conductor through which the winding $G^{10}$ is connected to the switch QA, and the contact $G^{11'}$ is connected to the conductor through which the winding $G^9$ is connected to the switch Q. In consequence with the contact $D^{10}$ in engagement with either of the contacts $G^{11'}$ or $G^{12'}$, operation of the reset motor will be continuous and not dependent on the adjustment of either of the switches Q and QA.

In Fig. 9 I have illustrated a preferred circuit arrangement for securing the same general control actions and effects as are obtainable with the circuit arrangement shown in Fig. 3, and the modifications or developments thereof, shown in Fig. 7. The elements of the circuit arrangement of Fig. 9 for the most part, are similar in character and purpose, to parts designated by the same reference symbols, which are shown in other figures and have already been described. The principal difference between the arrangement shown in Fig. 9, and those previously described, is in respect to the manner in which manual control is effected.

In Fig. 9, when switch blades $N'$ and $N^2$ are adjusted into their dotted line positions for manual control, they operatively disconnect the resistor $d$ and fixed resistors $da$ from the control circuit, and operatively connect into the latter two fixed resistors $gf$ one connecting one, and the other the second of the switch blades $N'$ and $N^2$ to the end of the resistance $gc$ remote from the contact $G^5$. The resistances $gf$ are of equal magnitude, and collectively their resistances should be great enough to prevent an objectionably large current flow through them between the transformer terminals 23 and 24. Their purpose is to collectively provide what may be called a potentiometer resistance, whereby when the apparatus is adjusted for manual control, the end of the resistance $gc$ remote from the contact $G^5$, is maintained at the same potential as it would have in normal automatic control, when the instrument contact $D'$ is in its mid, normal value position.

The adjustment of the switch blades $N'$ and $N^2$ into their dotted line, manual control positions, renders the reset motor $G^7$ inoperative, since the contact $D^{10}$ is connected to the conductor 27 through which one end of the resistor $d$ is connected to a terminal of the switch N, which is engaged, or not engaged, by the blade $N^2$, accordingly as the switch N is in its automatic or manual control position.

With the switch blades $N'$ and $N^2$ in their dotted line positions, manual control is effected by manual adjustment of the contacts $G^5$ and $G^{20}$ along the reset resistors $gb$ and $gd$ along which those contacts are adjusted by the reset motor $G^7$ in automatic control.

Figure 12:
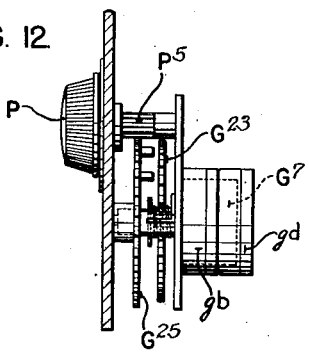
Fig. 12 is an elevation partly in section, illustrating details of a manually adjustable mechanism shown in Fig. 11.

The means shown diagrammatically in Fig. 9, and shown also in Figs. 11 and 12 for the manual and automatic adjustments of the contacts $G^5$ and $G^{20}$, comprise a gear $G^{22}$ on the shaft $G^8$ of reset motor $G^7$, a gear $G^{23}$ in mesh with the gear $G^{22}$, gear $G^{24}$ coaxial with and frictionally connected to the gear $G^{23}$, a gear $G^{25}$ in mesh with the gear $G^{24}$ and also in mesh with a gear $P^6$ carried by the shaft of the manual control knob or dial P. The gear $G^{25}$ is carried by a shaft $G^{26}$, which is operatively connected to the contacts $G^5$ and $G^{20}$ so that one of the latter is raised as the other is lowered when the gear $G^{25}$ is turned in one direction or the other. With the reset motor $G^7$ out of operation, the contact $G^5$ and $G^{20}$ may be adjusted by the knob P, the friction clutch connection between gears $G^{23}$ and $G^{24}$ yielding to permit the adjustment. In automatic control operation, the knob P is rotated, idly, through the gear $G^{25}$, whenever the latter is rotated by the reset motor $G^7$.

The control circuit arrangement shown in Fig. 9 includes a manually controlled switch IA, for opening and closing the entire control circuit when desirable. Manually operated switches IA' and $IA^2$ are also provided which are adapted to interrupt the bridge and reset circuits respectively if desired. A switch $IA^3$ is inserted in the common lead between motor windings $E^2$ and $E^3$ and line I which when opened together with switch IA' deenergizes the bridge circuit and the circuit to motor E but does not deenergize the amplifier J. The last mentioned switch arrangement is useful in a multiple recorder responsive successively to a plurality of conditions not all of which are desired to control the valve motor. It also includes a four-electrode tilting mercury switch MC which is tilted in one direction or the other to energize one or the other of the field windings $E^2$ and $E^3$ of the relay motor E, whenever the control motor L is started into operation in one direction or the other. The switch MC thus replaces the two switches MA and MB of Fig. 3, as the switch means through which the amplifier J and the motor L control the energization of the relay motor E. The switch MC, however, does not give the protection against motor coasting, which is obtainable by the use of the switches MA and MB.

Manual control by reset contact adjustment may be effected with circuit arrangements and adjusting mechanisms quite different in form from those shown in Fig. 9. Thus, for example, manual control may be effected with the circuit arrangement of Fig. 3, modified only by the addition of the switches $N^3$ and $N^4$ shown in Fig. 3A. With the switch $N^3$ of Fig. 3A in its normal full line position, the contact D' is connected to the resistance $gd$ in Fig. 3A, just as it is permanently connected in Fig. 3. With the switch $N^3$ of Fig. 3A in its dotted line position, however, the contact D' is disconnected from the control circuit, and the center tap $d^{10}$ of the resistor $d$ is connected to the reset contact $G^5$ through the resistance $gd$. With the switch $N^4$ of Fig. 3A in its full line position, the contact $D^{10}$ is connected through the conductor 18 to the supply conductor I as in Fig. 3. A counterclockwise movement of the switch $N^4$ out of its full line position brings it into engagement with a switch contact $N^5$ and a further movement in the same direction of the switch $N^4$ brings the latter into engagement with a switch contact $N^6$. The switch blade $N^4$ may also be maintained in position intermediate its two dotted line positions shown in Fig. 3A, in which it is not in engagement with either of the contacts $N^4$ and $N^5$.

The contacts $N^5$ and $N^6$ are connected to the contacts $G^{122}$ and $G^{123}$, respectively.

As will be apparent, with the switch $N^3$ in its dotted line position, the position of the contact E' is dependent upon the position of the contact $G^5$. Any change in adjustment of the contact $G^5$ will then change the potential difference between the contacts E' and $G^{13}$ which is impressed on the amplifier J, and will result in an energization of the motor E in the direction of the magnitude required for such adjustment of the contact E' as is needed to neutralize the potential difference between the contacts E' and $G^{13}$ created by said change in adjustment of the contact $G^5$. With the switch $N^4$ in engagement with the contact $N^5$, the motor $G^7$ will be energized to adjust the contact $G^5$ in one direction and the contact $G^5$ will be adjusted in the opposite direction by the motor $G^7$, when the switch $N^4$ is in engagement with the contact $N^6$. It is thus possible by adjustment of the switches $N^3$ and $N^4$ into their full line positions to obtain the automatic control provided for in Fig. 3, and by adjustment of said switches into other positions to make the adjustment position of the valve B wholly subject to manual control, although the valve adjustment is effected through the motor E.

In some cases, it may be desirable to operate with manual control for periods of considerable duration. In other cases, the switches $N^3$ and $N^4$ shown in Fig. 3A may be adjusted out of their full line positions only for brief intervals required for manually effecting reset adjustments in anticipation of a change in operating conditions, which would result in a delayed automatic reset adjustment, but for the manually effected anticipating adjustment.

Figure 3A:
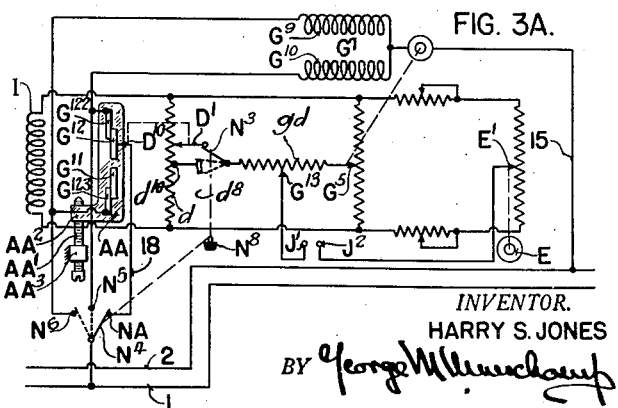
Fig. 3A illustrates one modification of apparatus shown in Fig. 3.
Figure 13:
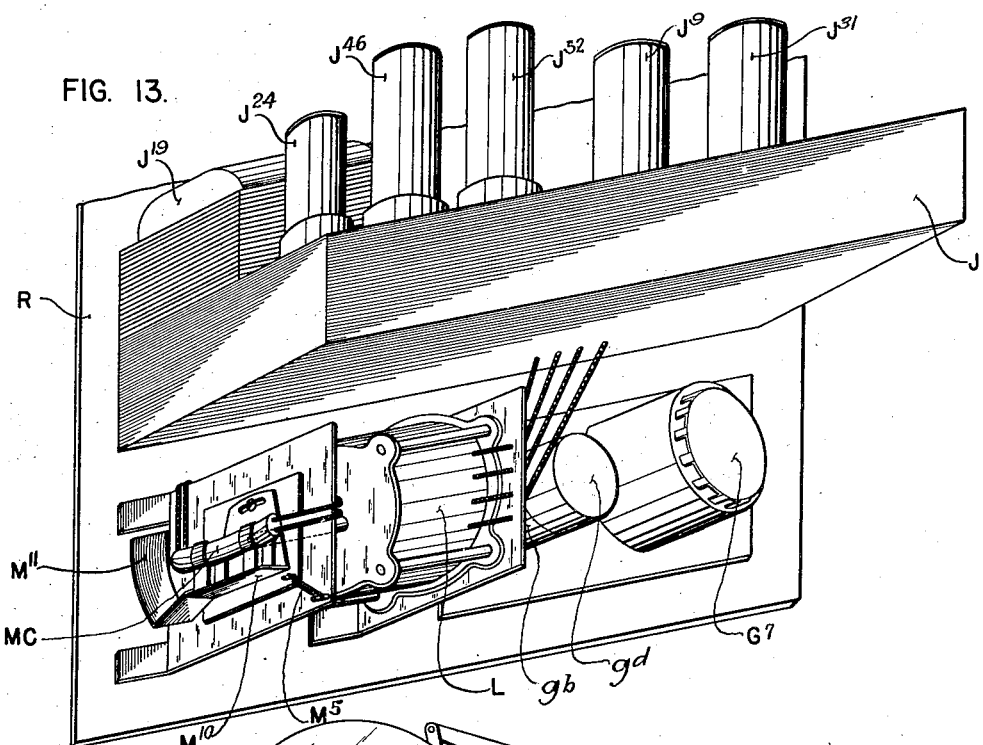
Fig. 13 is a perspective rear view of a portion of the apparatus shown in Fig. 11.

In the arrangement shown in Fig. 3A, the switches $N^3$ and $N^4$ may be connected by a link $N^8$, so that the switches will turn simultaneously into and out of their full line positions. In such case, the switch contact $d^8$ connected to the tap $d^{10}$, is in the form of an arc so that the connection between switch $N^3$ and contact $d^{10}$, is not interrupted by changes in position of the switch $N^3$, corresponding to the changes in position of the switch $N^4$, as the latter moves between its positions of engagement with the contacts $N^5$ and $N^6$. In effect, the switch parts $N^3$ and $N^4$ thus connected for simultaneous movement, form parts of a single manually operable switch, by which the control system may be made subject either to automatic control or to manual control, and by which anticipatory reset adjustments may be manually effected. It is in general essential that the switch $N^3$ should be located at the instrument, but the switch $N^4$, if not mechanically connected to the switch $N^3$, may be located at a distance from the instrument, thereby providing for remote manual control.

I have also illustrated in Fig. 3A means for adjusting the contacts $G^{11}$ and $G^{12}$ relative to the resistor $d$ by means including a sliding part AA on which the reset contacts are mounted. The member AA may be adjusted longitudinally of the resistor $d$ by means of adjusting screw AA' in threaded engagement with a projection $AA^2$ of the member AA and a boss $AA^3$ forming part of the instrument framework. If desired the contacts $G^{11}$ and $G^{12}$ may be left stationary and the resistor $d$ mounted on the member AA for adjustment relative thereto. As shown the contacts $G^{11}$ and $G^{12}$ may be made shorter than the correspondingly identified contacts of the figures previously described, and a pair of contacts $G^{122}$ and G$^{123}$ may be provided which are also adapted to be contacted by the member D$^{10}$ and are adjustable toward and away from the control point to thereby make adjustable the range through which the reset motor is operated.

In Figs. 11 to 15, I have illustrated one form of control apparatus for use in conjunction with, and to provide parts of, the control circuit arrangement of Fig. 9. It is to be understood, however, that most of the apparatus parts shown in Figs. 11 to 15, may be used with other control circuit forms of the invention. The apparatus shown in Fig. 11 comprises a control panel R, in which is mounted a control instrument DD, for measuring furnace temperature control quantity and for adjusting the contacts D' and D$^{10}$ of Fig. 9. In addition, panel R provides a support for all of the control apparatus shown in Fig. 9, except the relay motor E and associated balancing resistor e, both of which ordinarily must be located adjacent the fuel valve B or other device controlled, and at a distance from the control apparatus shown in Figs. 11 to 15.

As shown, the control instrument DD is of the commercial Brown Potentiometer type, including a pen carriage D$^{20}$ which is deflected in accordance with variations in the quantity measured by means of a screw shaft D$^{21}$. The latter is rotated in one direction or the other by the rebalancing mechanism of the instrument, in response to deflections of the pointer D$^{22}$ of a galvanometer which responds to unbalance in the potentiometer measuring system. When such a potentiometric instrument is used in lieu of the simple Bourdon tube type of thermometer D of Fig. 9, the furnace temperature responsive bulb C of Fig. 9 is ordinarily replaced by a thermocouple, and the galvanometer responds to unbalance between the thermocouple voltage and the voltage drop in the variable portion of potentiometer slide wire resistance portion, connected in series with the thermocouple and galvanometer. Further description or illustration of the measuring and rebalancing features of the instrument DD is unnecessary, as they form no part of the present invention, and in respect to those features, the instrument DD is of well known commercial type, and generally like, or equivalent in principle to, the control potentiometer instrument shown in the Harrison Patent No. 1,946,280, granted Feb. 6, 1934.

The Brown Potentiometer control instrument pen carriage D$^{20}$, gives movements to a pen D$^{23}$ tracing a record of the value of the quantity measured on a chart D$^{24}$, and cooperates, for control purposes, with a control table D$^{30}$. The latter is located at a point along the path of travel of the pen carriage D$^{20}$ which may be adjusted, and which fixes the normal or desired value of the control quantity measured by the instrument. A part D$^{31}$ carried by the control table D$^{30}$, and a cooperating part D$^{200}$ of the pen carriage D$^{20}$, cooperate to adjust a pivoted part D$^{32}$ angularly about its pivotal axis D$^{33}$, into different positions corresponding to different extents of departure of the controlled quantity from the desired or normal value thereof.

Figure 14:
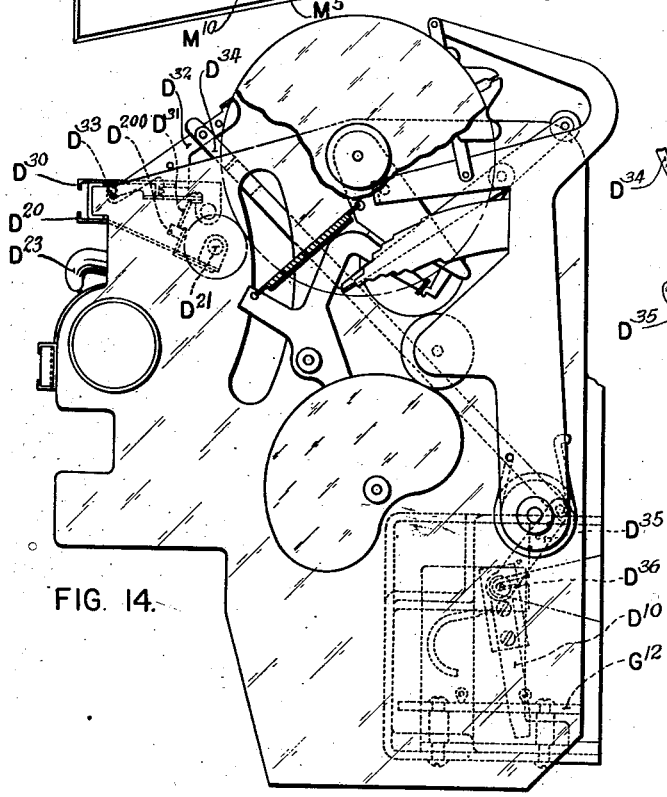
Fig. 14 is an end elevation of the instrument mechanism of Fig. 11.
Figure 15:
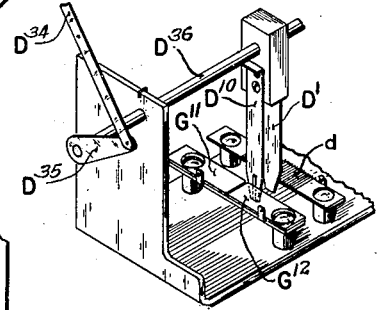
Fig. 15 is a perspective view of automatic switch adjusting means included in the instrument shown in Figs. 11 and 14.

As shown in Figs. 14 and 15, the member D$^{32}$ is connected by a link D$^{34}$ to the arm D$^{35}$ of rock shaft D$^{36}$ which is thereby given angular adjustments corresponding to those given the part D$^{32}$. The rock shaft D$^{36}$ supports and moves arms which constitute, or carry, the contacts D' and D$^{10}$ of Fig. 9, which engage the resistor d and the control contacts G$^{11}$ and G$^{12}$ of Fig. 9, respectively.

The panel R supports at its rear side, and below the instrument DD the supporting chassis of the amplifier J, and beneath the amplifier it carries the reset motor G$^7$, supports gb and gd for the reset resistors, a control motor L, and the switch MC, tilted by the motor L and controlling the relay motor E. As shown, the switch MC is mounted in a support M$^{10}$ oscillated by the motor L, and returned to its normal position, when the motor L is deenergized, by return means including a spring M$^5$, similar to that connected to the switch carrying disc M$^3$ of Figs. 3 and 4. The frame M$^{10}$ carries an arc shaped indicating part M$^{11}$, located back of an opening R$^2$ in the panel R and indicating whether the switch MC is in a position to energize in one direction or the other, or deenergize the motor E.

Mounted on the panel R at the front side of the latter are the previously mentioned knobs or dials G, H, and P, for effecting reset and throttling range adjustments and for effecting manual control. Also mounted on the panel R in position for adjustment from in front of the latter, are the switch N for shifting between automatic and manual control, the sensitivity adjustment device O, and the power switch IA.

As will be apparent to those skilled in the art, the instrument DD of Figs. 11 to 15 may be replaced by an instrument of any other known or suitable form, adapted to measure a control quantity, and directly, or through a suitable relay mechanism, give corresponding adjustments to the contacts D' and D$^{10}$. The control quantity is not necessarily a temperature, but may be a pressure, velocity, gravitational or other force, susceptible of measurement by the instrument, and the measure of which may be advantageously utilized in effecting control operations.

As will be apparent, the amplifier J, when used in accordance with the present invention, may take various forms, a preferred form being illustrated by way of example in Fig. 10.

As illustrated, the amplifier input terminals J' and J$^2$ are connected to the terminals of the resistor o which is provided for adjusting the sensitivity of the instrument as hereinbefore described. Specifically, a variable portion of the potential drop across resistor o is adapted to be impressed upon the input circuit of an electronic valve J$^9$ by means including a connection between one end of the resistor o and the cathode J$^{11}$ of valve J$^9$, and a connection between the valve control grid J$^{13}$ and the contact O' which is slidable along the resistor o.

The valve J$^9$ is a heater type pentode and includes an anode J$^{10}$, the cathode J$^{11}$, a heater filament J$^{12}$, the control grid J$^{13}$, a screen grid J$^{14}$, and a suppressor grid J$^{15}$ which is connected to the cathode J$^{11}$. As shown the end of the resistor o which is connected to the cathode J$^{11}$ may desirably be connected to ground as indicated at J$^{16}$ and a cathode biasing resistor J$^7$, shunted by a condenser J$^8$, may be inserted in the connection between the cathode J$^{11}$ and ground.

Anode voltage is supplied the valve J$^9$ from a suitable rectifier J$^{18}$ which may be energized from the alternating current supply conductors I and 2 through a rectifier valve J$^{24}$ and a transformer J$^{19}$. The transformer J$^{19}$ is a combination step up and step down transformer and includes a line voltage primary winding J$^{20}$, a high voltage secondary winding J$^{21}$, and low voltage secondary windings $J^{22}$ and $J^{23}$. The rectifier valve $J^{24}$ may be a conventional full wave rectifier valve and is shown having each of its anodes $J^{25}$ and $J^{26}$ connected to a respective terminal of the transformer secondary winding $J^{21}$ and its filament cathode $J^{27}$ connected to the terminals of the secondary winding $J^{23}$ and adapted to receive energizing current therefrom.

A center tap on the secondary winding $J^{21}$ constitutes the negative terminal of the rectifier and is connected to the grounded side of the amplifier by a conductor 28 and one side of the secondary winding $J^{23}$ constitutes the positive side of the rectifier and is connected to the anode $J^{10}$ by a conductor 29 in which a pair of resistors $J^{28}$ and $J^{29}$ are inserted. Voltage is applied to the screen grid $J^{14}$ from the rectifier $J^{18}$ and as shown is connected to the positive side thereof by a conductor 30 through a resistor $J^{30}$. As shown, a condenser $J^{17}$ may desirably be connected between the screen grid $J^{14}$ and the grounded side of the amplifier so that a direct current voltage which is substantially free from alternating current ripples will be applied to screen grid $J^{14}$. Similarly a condenser $J^{42}$ may be connected between the point of connection of resistors $J^{28}$ and $J^{29}$ and ground for filtering the direct current voltage applied on the anode $J^{10}$.

As illustrated, the sliding contact $O'$ may desirably be connected to the grid cap of valve $J^9$ when a grid cap is provided, and when metal tubes are employed the metal case may be connected to the grounded side of the amplifier by a conductor 31, for example.

The output circuit of valve $J^9$ is resistance-capacity coupled to the input circuit of a second electronic valve 31 which is shown as a heater type pentode including an anode $J^{32}$, a cathode $J^{33}$, a heater filament $J^{34}$, a control grid $J^{35}$, a screen grid $J^{36}$, and a suppressor grid $J^{37}$. As shown the anode $J^{10}$ of valve $J^9$ is connected through a condenser $J^{38}$ and a resistor $J^{39}$ to the grounded side of the amplifier and the point of connection of the condenser $J^{38}$ and resistor $J^{39}$ is connected to the control grid $J^{35}$ of valve $J^{31}$. The cathode $J^{33}$ is connected through a cathode biasing resistor $J^{40}$ which is shunted by a by-pass condenser $J^{41}$ to the grounded side of the amplifier so that the pulsations in the current conducted by the valve $J^9$ as a result of the appearance of an alternating voltage across the terminals of resistor $o$ will result in the application of a corresponding fluctuating potential to the input circuit of valve $J^{31}$.

The screen grid $J^{36}$ of valve $J^{31}$ is connected by a conductor 31 to the conductor 30 which is connected to the screen grid $J^{14}$ of valve $J^9$ so that the two screen grids $J^{14}$ and $J^{36}$ are maintained at the same potential. Anode voltage is supplied the valve $J^{31}$ from the rectifier $J^{18}$ and as shown the anode $J^{32}$ is connected by a conductor 32 in which the primary winding $J^{44}$ of a transformer $J^{43}$ is inserted and a conductor 33 to the point of connection of resistors $J^{28}$ and $J^{29}$.

The terminals of the secondary winding $J^{45}$ of transformer $J^{43}$ are connected to respective control grids $J^{50}$ and $J^{56}$ of a pair of electronic valves $J^{46}$ and $J^{52}$, which desirably may be connected in push pull. The valve $J^{46}$ is a heater type tetrode preferably of the type known commercially as beam power amplifier tubes and includes an anode $J^{47}$, a cathode $J^{48}$, a heater filament $J^{41}$, a control grid $J^{50}$, and a screen grid $J^{51}$ and the valve $J^{52}$ which is of a similar type includes an anode $J^{53}$, a cathode $J^{54}$, a heater filament $J^{55}$, a control grid $J^{56}$ and a screen grid $J^{57}$. Anode voltage is supplied these valves from the rectifier $J^{18}$ and as shown the anodes $J^{53}$ and $J^{47}$ are connected to respective ends of the secondary winding $J^{59}$ of a transformer $J^{58}$, and a center tap on the winding is connected by a conductor 34 directly to the positive side of the rectifier. The grounded side of the amplifier is connected to a center tap on the transformer secondary winding $J^{45}$ and through a cathode biasing resistor $J^{61}$ to the cathodes of valves $J^{46}$ and $J^{52}$ which are connected together. Voltage may be supplied the screen grids $J^{51}$ and $J^{57}$ from the rectifier $J^{18}$ through a resistor $J^{62}$.

It is noted that the anode and screen grid voltages applied to the valves $J^9$ and $J^{31}$ are filtered by the condensers $J^{17}$ and $J^{42}$ but that the anode and screen grid voltages applied the valves $J^{46}$ and $J^{52}$ are not filtered. In operation I have found that filtering of the direct current voltages applied the valves $J^{46}$ and $J^{52}$ is not required for satisfactory operation and may therefore be omitted resulting in a material reduction in the apparatus involved.

A condenser $J^{63}$ is preferably, although not necessarily connected between the sliding contact $O'$ and ground to so filter the alternating current flow through the resistor $o$ as to prevent the passage of disturbing high frequency currents. Similarly a condenser $J^{64}$ may be connected between the control grid $J^{35}$ of valve $J^{31}$ and ground to filter out any disturbing high frequency currents which may not have been stopped by the condenser $J^{63}$.

In operation when an alternating voltage of line frequency appears across the terminals of the resistor $o$, the valve $J^9$ will be alternately rendered more conductive and less conductive and accordingly a pulsating potential of phase dependent upon the phase of the A. C. input voltage will be applied to the input circuit of valve $J^{31}$. This pulsating potential is amplified by the valve $J^{31}$ and the resulting pulsating current flows through the transformer primary winding $J^{44}$ result in the induction of an alternating voltage of line frequency in the transformer secondary winding $J^{45}$. The transformer $J^{43}$ is preferably a step-up transformer so that the voltage across the secondary winding $J^{45}$ will be higher than the voltage across the primary winding $J^{44}$.

When the control grids $J^{50}$ and $J^{56}$ of valves $J^{46}$ and $J^{52}$ are at the same potential both of these valves will be equally conductive and a steady current will flow through the opposite halves of the transformer primary winding $J^{59}$. When an alternating voltage appears across the terminals of the transformer secondary winding $J^{45}$, however, the potentials of grids $J^{50}$ and $J^{56}$ are swung, in opposite phase, at a frequency corresponding to the supply line frequency and the valves $J^{46}$ and $J^{52}$ are each alternately rendered more conductive and less conductive, one valve being more conductive while the other is less conductive. The resulting pulsating current flows through the transformer primary winding $J^{59}$ in successively opposite directions through the opposite halves of the transformer result in the induction of an alternating voltage of line frequency in the transformer secondary winding $J^{60}$ whose phase and amplitude is determined by the phase and amplitude of the alternating voltage across the terminals of resistor $o$.

The terminals of the transformer secondary winding $J^{60}$ are connected to one phase winding $L'$ of the two phase rotating field motor L and the other phase winding $L^2$ of the motor is connected to a suitable voltage shown as including one side of the secondary of transformer I and the mid point thereof. By properly proportioning the various circuit constants in the amplifier, I have found that a phase shift of approximately 90° may be made to occur between the alternating voltage across the terminals of the transformer secondary winding $J^{60}$ and the alternating voltage impressed on the terminals of the resistor o and since the motor winding $L^2$ is arranged to be energized by currents in phase with or 180° out of phase with the line voltage, the magnetic fields set up by the two motor windings will be displaced by approximately 90° with the result that a rotating magnetic field will be set up in the motor in one direction or the other and the motor rotor will accordingly be rotated in a corresponding direction. Thus, depending upon the phase of the alternating voltage impressed upon the terminals of the resistor o the motor L will be selectively energized for rotation in one direction or the other.

As shown a condenser $J^{65}$ may be connected across the terminals of the transformer secondary winding $J^{45}$ for tuning the transformer $J^{43}$ to resonance at the frequency of the supply conductors 1 and 2 and for impressing a full wave alternating voltage upon the control grids $J^{50}$ and $J^{56}$ from the pulsations impressed upon the transformer primary winding $J^{44}$ by the valve $J^{31}$. A condenser $J^{66}$ of suitable capacity may be connected across the terminals of the transformer primary winding $J^{59}$.

In order to prevent damage to any of the circuit components in the event of accidental short circuiting of points of widely displaced potentials, for example, as may be occasioned by faulty valve construction, a fuse $J^{67}$ of suitable capacity may desirably be connected between the center tap on the transformer secondary winding $J^{21}$ and the conductor 28. Thus, if the rectifier $J^{18}$ is overloaded as a result of a short circuit condition, the fuse will be blown, thereby preventing damage to the transformer $J^{19}$ or any other of the circuit parts.

It is noted that an amplifier J having no provisions for introducing a phase shift in the amplified voltage may be employed if a motor L having one winding of relatively high inductance and one winding of relatively low inductance is employed. The highly inductive winding may be connected to the supply conductors 1 and 2 and as will be apparent the current flow in that winding will lag nearly 90° behind the voltage of the supply conductors 1 and 2. With this arrangement the winding of low inductance may and should be connected to the output terminals of the amplifier and the amplifier should preferably include means to prevent the current flow in that winding from appreciably lagging behind or leading the exciting voltage between conductors 1 and 2. In consequence, the current flow in the low inductance motor winding will lead or lag by nearly 90° the current flow in the highly inductive winding, accordingly as the alternating potential impressed on the amplifier input terminals is in phase with or 180° out of phase with the voltage of the supply conductors 1 and 2.

As will be clear from the foregoing, the proportioning and reset adjustment elements may be widely varied in their cooperative relations within the scope of this invention. The resistor d may be adjusted relative to the contacts $G^{11}$ and $G^{12}$ if it is desired that a larger part or all of the valve throttling action shall take place on one side of the "control point" or neutral position. The contacts $G^{11}$ and $G^{12}$ may also be varied so as to be ineffective along certain parts of the scale as may be desirable in certain cases such for example as during a heating up period in a temperature control system. The contacts $G^{11}$—$G^{111}$ and $G^{12}$—$G^{121}$ may, furthermore, be arranged generally as shown in Fig. 8A with a plurality of segments connected to the reset motor fields through resistances of different values whereby the reset motor speed may be varied in accordance with the extent of departure of the condition or contacts $G^{11}$ and $G^{12}$ themselves may be formed of high resistance material, in convolutions if necessary, so that the reset motor speed is controlled.

While in accordance with the provisions of the statutes, I have illustrated and described the best forms of embodiment of my invention now known to me, it will be apparent to those skilled in the art that changes may be made in the forms of the apparatus and methods disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In an electrical control system, a bridge circuit including measuring and reset resistors, measuring and reset contacts respectively engaging said resistors, each said resistor and associated contact being adapted for relative movement to form measuring and reset couples, means responsive to the direction of departure of a control quantity from a normal value of said quantity for correspondingly adjusting the measuring couple relative to a normal adjustment of the latter, means responsive to the direction and duration of said departure for adjusting said reset couple, a control device, means dependent on the relative potentials of said contacts for effecting adjustments of said device tending to maintain said quantity at its normal value, said last mentioned means comprising a connection between said contacts including a resistance adjustable to vary the ratio of the reset couple adjustment to the extent of adjustment of said device resulting from the reset couple adjustment.

2. In an electric control system, a bridge circuit including measuring, control and reset resistors, measuring, control and reset contacts respectively engaging said resistors, each said resistor and associated contact being adapted for relative movement to form measuring, control and reset couples, means responsive to the direction of departure of a control quantity from a normal value of said quantity for correspondingly adjusting the measuring couple, means responsive to the direction and duration of said departure for correspondingly adjusting said reset couple, a control device, a resistor connecting said measuring and reset contacts, a contact which and the last mentioned resistor are relatively adjustable, and means responsive to the potential difference between the last mentioned contact and said control contact for effecting adjustments of said device tending to maintain said quantity approximately at said normal value, and for effecting adjustments of said control couple proportional to the previously mentioned adjustments.

3. In an electric control system, a bridge circuit including measuring, control and reset resistors, measuring, control and reset contacts respectively engaging said resistors, each said resistor and associated contact being adapted for relative movement to form measuring, control and reset couples, means responsive to the direction of departure of a control quantity from a value of said quantity for correspondingly adjusting the measuring couple, means responsive to the direction and duration of said departure for correspondingly adjusting said reset couple, a control device, a resistance connecting said reset contact to a point in said circuit normally at the same potential as the measuring contact, and means responsive to the difference between the potential drop in the portion of control resistor at one side of the control contact and the sum of the potential drops in the reset resistor at one side of the reset contact and in said resistance, for effecting adjustments of said device tending to maintain said quantity approximately at a said normal value, and for effecting adjustments of said control couple proportional to the previously mentioned adjustments.

4. In an electrical control system, a bridge circuit including measuring and reset resistors, measuring and reset contacts respectively engaging said resistors, each said resistor and associated contact being adapted for relative movement to form measuring and reset couples, means responsive to the direction of departure of a control quantity from a normal value thereof for correspondingly adjusting the measuring couple relative to a normal adjustment of the latter, a reversible electric motor adapted to adjust said reset couple in a direction corresponding to the direction of motor operation, means independent of the actual value of said quantity for continuously energizing said motor for operation in one direction, and means dependent on the value of said quantity for neutralizing the effect of said motor energizing means and energizing said motor in the opposite direction whenever the value of said quantity is at one side of the said normal value thereof.

5. In an electric control system, a bridge circuit including measuring and reset resistors, measuring and reset contacts respectively engaging said resistors, each said resistor and associated contact being adapted for relative movement to form measuring and reset couples, means responsive to the direction of departure of a control quantity from a normal value thereof for correspondingly adjusting the measuring couple, a reversible electric motor adapted to adjust said reset contact in a direction dependent on the direction of motor operation, said motor having two energizing circuits, one of which is continuously energized and subjects the motor to an energizing effect adapted to operate the motor in one direction when the other circuit is not energized, and said other circuit being adapted, when energized, to subject the motor to an energizing effect opposite in direction to and more powerful than the first mentioned effect, means for energizing and deenergizing said second energizing circuit accordingly as the value of said quantity is at one side or the other of a predetermined normal value thereof, and control means actuated in accordance with the adjustments of the measuring and reset couples following said departure.

6. In an electric control system, a bridge circuit including measuring and reset resistors, measuring and reset contacts respectively engaging said resistors, each said resistor and associated contact being adapted for relative movement to form measuring and reset couples, means responsive to the direction of departure of a control quantity from a normal value thereof for correspondingly adjusting the measuring couple, resetting means having a continuous tendency to adjust said reset couple in one direction and means for neutralizing said tendency and adjusting said reset couple in the opposite direction when the value of said quantity is at one side of a normal value thereof, and control means actuated in accordance with the adjustments of said measuring and reset couples following said departure.

7. In an electric control system, a bridge circuit including a measuring resistor, a control resistor, and two reset resistors all connected in parallel, measuring, control and reset contacts, respectively engaging said resistors, each said resistor and associated contact being adapted for relative movement to form measuring, control and reset couples, means responsive to the direction of departure of the control quantity from a normal value thereof for correspondingly adjusting said measuring couple, means responsive to the direction and duration of said departure for correspondingly adjusting each of said reset couples, a resistance connecting one of said reset contacts to said control contact, a resistance connecting the other reset contact to the measuring contact, an adjustable control device effecting a control action and an adjustment of said control couple each proportional to adjustment of said device, and means responsive to a potential difference between an intermediate point of one of said resistances and an intermediate point of the other resistance for adjusting said device in the direction to neutralize said potential difference.

8. In an electric control system, a bridge circuit including a measuring resistor, a control resistor, and two reset resistors all connected in parallel, measuring, control and reset contacts, respectively engaging said resistors, each said resistor and associated contact being adapted for relative movement to form measuring, control and reset couples, means responsive to the direction of departure of the control quantity from a normal value thereof for correspondingly adjusting said measuring couple, means responsive to the direction and duration of said departure for correspondingly adjusting each of said reset couples, an adjustable control device and means through which its adjustment effects proportional adjustment of said control couple, a slide wire resistance connecting one of said reset contacts to said control contact, a slide wire resistance connecting the other reset contact to the measuring contact, a contact engaging each of said resistances, each of the last mentioned contacts and resistances being relatively adjustable to form two control couples, and means responsive to a potential difference between the last mentioned contacts for adjusting said device in the direction to neutralize said potential difference and means for simultaneously adjusting the last mentioned couples.

9. A control system as specified in claim 8, including manually operable means for simultaneously adjusting the two last mentioned control couples.

10. In an electric control system, a bridge circuit including a measuring resistor, a control resistor, and two reset resistors all connected in parallel, measuring, control and reset contacts, respectively engaging said resistors, each said resistor and associated contact being adapted for relative movement to form measuring, control and reset couples, means responsive to the direction of departure of the control quantity from a normal value thereof for correspondingly adjusting said measuring couple, means responsive to the direction and duration of said departure for automatically effecting a corresponding adjustment of each of said reset couples, a resistance connecting one of said reset contacts to said control contact, a second resistance having one end connected to the other reset contact and its second end connected to the measuring contact, an adjustable control device adapted to effect a control action and an adjustment of said control couple, each proportional to the adjustment of said device, means responsive to the potential difference between an intermediate point of one of said resistances and an intermediate point of the other resistance for adjusting said device in the direction to neutralize said potential difference, and means for the manual control of said control device comprising means for maintaining said second end of said second resistance at a constant potential intermediate the potentials of the ends of said resistors and means independent of the direction and duration of said departure for similarly adjusting the two reset couples.

11. In an electrical control system, a bridge circuit including first, second, and third resistors, and a resistance connected in parallel, first, second and third contacts respectively engaging said resistors and forming respectively first, second and third adjustable control couples, means for adjusting said first couple in accordance with variations in a control quantity, a connection between said first contact and the mid point of said resistance, a first resistance connected between said mid point and second contact, a second resistance connected between said mid point and third contact, means responsive to the direction and duration of departure of said control quantity from a predetermined value thereof for adjusting said third couple, means responsive to the relative current flows in the portions of said resistance at opposite sides of its intermediate point adapted to adjust said second couple so as to equalize the current flows in said resistance portions and to produce a corresponding control effect.

12. In an electrical control system, a bridge circuit including measuring and control slide wire resistors, measuring and control contacts respectively engaging said resistors, each said resistor and associated contact being adapted for relative movement to form measuring and control couples, means responsive to variations in a control condition for adjusting said measuring couple in accordance with the variations in said condition, a control device, an electric motor adapted to simultaneously and correspondingly adjust said device and control couple, said motor having two energizing circuits and being adapted to operate in one direction or the other, or to stall, accordingly as one, or the other, or both of said energizing circuits are energized, and controlling means for said motor responsive to an electric condition of said circuit varied by adjustment of said control couple, for effecting a motor operation adjusting said control couple to neutralize the change in said electrical condition, said controlling means comprising a first switch associated with both of said circuits and normally in position in which it prevents energization of both circuits, but adjustable away from said position in one direction to permit energization of one, and in the opposite direction to permit energization of the other of said circuits, and a second switch normally in position permitting energization of both circuits and adjustable away from the last mentioned position in one direction to prevent energization of one, and in the opposite direction to prevent energization of the other of said windings, and switch operating means moving said second switch out of its said position, respectively after said first switch is moved out of its said position, and moving said second switch back into its said position before said first switch is returned to its said position.

13. In an electrical control system, a bridge circuit including measuring, control and reset resistors, measuring, control and reset contacts, respectively engaging said resistors, each said resistor and associated contact being adapted for relative movement to form measuring, control and reset couples, means responsive to the direction of departure of a control quantity from a normal value of said quantity for correspondingly adjusting the measuring couple, reset means normally responsive to the direction and duration of said departure for correspondingly adjusting said reset couple, an adjustable device adapted on its adjustment to adjust a control action and correspondingly adjust said control couple, means including a network comprising a terminal connected to each of said contacts and responsive to the potentials thereof normally operative to effect adjustments of said device tending to maintain said quantity at its normal value, and optionally operable means controlling the adjustment of said device and comprising means for impressing a constant potential on said one terminal and manual means for adjusting said reset couple.

14. In an electrical control system, a bridge circuit including measuring and control slide wire resistors, measuring and control contacts respectively engaging said resistors, each said resistor and associated contact being adapted for relative movement to form measuring and control couples, means responsive to variations in a control condition for adjusting said measuring couple in accordance with the variation in said condition, a control device, an electric motor adapted to simultaneously and correspondingly adjust said device and control couple, said motor having two energizing circuits and being adapted to operate in one direction or the other, or to stall accordingly as one or the other, or both of said energizing circuits are energized, and controlling means for said motor responsive to an electric condition of said circuit in which a change is effected by an adjustment of said measuring couple, and adapted to effect a motor operation adjusting said control couple in the direction to neutralize said condition change and comprising means adapted to energize and deenergize one of said windings at the beginning and conclusion of a corresponding control contact adjustment, and to energize the second motor winding shortly prior to the deenergization of said one winding.

15. In an electric control system, a bridge circuit including measuring and control resistors, measuring and control contacts respectively engaging said resistors, each said resistor and associated contact being adapted for relative movement to form measuring and control couples, means responsive to the direction of departure of a control quantity from a normal value of said quantity for correspondingly adjusting the measuring couple, an adjustable control device adapted to exert a control action dependent on its adjustment and to adjust said control couple in accordance with said adjustment, a circuit network including two terminals respectively connected to points in said control circuit between which an adjustment of said measuring couple creates a potential difference which may be eliminated by a corresponding adjustment of said control couple, said network including electronic amplifying means, a rotatable electric motor directly and continuously controlled by said amplifying means, a second motor controlled by the first mentioned motor and adapted to actuate said device in one direction or the other accordingly as the potential of one of said points exceeds or is less than the potential of the other point.

16. In an electric control system, a bridge circuit including measuring and control resistors, measuring and control contacts respectively engaging said resistors, each said resistor and associated contact being adapted for relative movement to form measuring and control couples, means responsive to the direction of departure of a control quantity from a normal value of said quantity for correspondingly adjusting the measuring couple, an adjustable control device adapted to exert a control action and to adjust said control couple in accordance with its own adjustment, a resistance connecting two points in said control circuit between which an adjustment of said measuring couple creates a potential difference which may be eliminated by a corresponding adjustment of said control couple, and means adjustably connected to said resistance to respond to an adjustable portion of the potential drop in said resistance for effecting an adjustment of said control device eliminating said potential drop.

17. In an electrical control system, a bridge circuit including measuring and reset resistors, measuring and reset contacts respectively engaging said resistors, each said resistor and associated contact being adapted for relative movement to form measuring and reset couples, means responsive to the direction of departure of a control quantity from a normal value of said quantity for correspondingly adjusting said measuring couple, a control device adapted to operate in response to a potential difference between two points of said circuit, the relative potentials of which are varied by adjustment of either couple and means responsive to the said departure and to the direction of subsequent change in said quantity for adjusting the reset couple in a direction dependent upon the direction of said departure during the period between each such departure and the return of the control quantity to its normal value except the portion of said period during which the control quantity is returning to its normal value.

18. In an electrical control system, a bridge circuit including measuring and reset resistors, measuring and reset contacts respectively engaging said resistors, each said resistor and associated contact being adapted for relative movement to form measuring and reset couples, means responsive to the direction of departure of a control quantity from a normal value of said quantity for correspondingly adjusting said measuring couple, a control device adapted to operate in response to a potential difference between two points of said circuit, the relative potentials of which are varied by adjustment of either couple and means responsive to the said departure and to the direction of subsequent change in said quantity for adjusting the reset couple in a direction dependent upon the direction of said departure during the period between each such departure and the return of the control quantity to its normal value except the portion of said period during which the control quantity is returning to its normal value, and including means responsive to a predetermined extent of departure of said condition for effecting said reset adjustment independently of the direction of condition change.

19. In an electric control system, a bridge circuit including measuring and control resistors, measuring and control contacts respectively engaging said resistors, each said resistor and associated contact being adapted for relative movement to form measuring and control couples, means responsive to the direction of departure of a control quantity from a normal value of said quantity for correspondingly adjusting the measuring couple, an adjustable control device adapted to exert a control action dependent on its adjustment and to adjust said control couple in accordance with said adjustment, a circuit network including two terminals respectively connected to points in said control circuit between which an adjustment of said measuring couple creates a potential difference which may be eliminated by a corresponding adjustment of said control couple, said network including electronic amplifying means, a rotatable electric motor directly and continuously controlled by said amplifying means, mercury switch means actuated by said motor, a second motor controlled by said mercury switch means and adapted to actuate said device in one direction or the other accordingly as the potential of one of said points exceeds or is less than the potential of the other point.

20. In an electric control system, a bridge circuit including measuring, control and reset resistors, measuring, control and reset contacts respectively engaging said resistors, each said resistor and associated contact being relatively adjustable to form measuring, control and reset couples, means responsive to the direction of change of a control quantity for correspondingly adjusting the measuring couple, an adjustable control device adapted to exert a control action dependent on its adjustment and to adjust said control couple in accordance with said adjustment, means responsive to the departure of said control quantity from a normal value thereof and adapted to effect adjustment of said reset couple in accordance with the direction of said departure, a circuit network including two terminals respectively connected to points in said control circuit between which an adjustment of said measuring couple creates a potential difference which may be eliminated by a corresponding adjustment of said control couple, said network including electronic amplifying means the phase of the output current of which is dependent upon the direction of unbalance in said network, a motor directly controlled by said amplifying means including one winding energized from an alternating current supply source and a second winding connected to be energized by said amplifier whereby said motor is energized in one direction or the other depending upon the phase relation of said amplifier and supply sources, and adapted to actuate said device in one direction or the other accordingly as the potential of one of said points exceeds or is less than the potential of the other point.

21. In an electric control system, a bridge circuit including measuring, control and reset resistors, measuring, control and reset contacts respectively engaging said resistors, each said resistor and associated contact being relatively adjustable to form measuring, control and reset couples, means responsive to the direction of change of a control quantity for correspondingly adjusting the measuring couple, an adjustable control device adapted to exert a control action dependent on its adjustment and to adjust said control couple in accordance with said adjustment, means responsive to the departure of said control quantity from a normal value thereof and adapted to effect adjustment of said reset couple in accordance with the direction of said departure, a circuit network including two terminals respectively connected to points in said control circuit between which an adjustment of said measuring couple creates a potential difference which may be eliminated by a corresponding adjustment of said control couple, said network including electronic amplifying means, a rotatable electric motor directly and continuously controlled by said amplifying means, and a second motor controlled by the first mentioned motor and adapted to actuate said device in one direction or the other accordingly as the potential of one of said points exceeds or is less than the potential of the other point.

22. In an electric control system, a bridge circuit including a measuring impedance, a control impedance, and two reset impedances all connected in parallel, measuring, control and reset adjustors, respectively cooperating with said impedances and forming therewith measuring, control, and reset couples, means responsive to the direction of departure of the control quantity from a normal value thereof for correspondingly adjusting said measuring couple, means responsive to the direction and duration of said departure for correspondingly adjusting each of said reset couples, an impedance device connecting one of said reset couples to said control couple, an impedance device connecting the other reset couple to the measuring couple, an adjustable control device effecting a control action and an adjustment of said control couple each proportional to adjustment of said control device, and means responsive to a potential difference between one of said impedance devices and the other impedance device for adjusting said control device in the direction to neutralize said potential difference.

23. A control system as specified in claim 22 including a throttling range adjusting impedance, and means for adjusting the impedance devices to vary the effect of a given adjustment of said reset couples without substantially changing the effect of the existing throttling range adjustment.

24. In combination, a device to be positioned in a plurality of positions for controlling the value of a condition, a control potentiometer adjusted in accordance with changes in the value of the condition to be controlled and having a desired adjustment corresponding to a desired normal value of the condition, a balancing potentiometer adjusted by the device, means including means for connecting the control potentiometer and the balancing potentiometer in parallel for positioning the device in accordance with the adjustment of the control potentiometer to maintain the value of the condition to be controlled within certain limits, a compensating potentiometer, a reversible electric motor for adjusting the compensating potentiometer, switching means operated upon deviation of the value of the condition to be controlled from the desired normal value for operating the reversible electric motor in a direction depending upon the direction of deviation, and means for connecting the compensating potentiometer in parallel with the control potentiometer additionally to position the device with respect to the adjustment of the control potentiometer for returning the value of the condition toward the desired normal value.

25. In an electrical control system, a bridge circuit including a measuring resistor, a control resistor, measuring and control contacts respectively engaging said resistors, each said resistor and associated contact being adapted for relative movement to form measuring and control couples, a source of energizing voltage, a connection between said measuring and control contacts including said voltage source, means responsive to the variations in a variable quantity to adjust said measuring couple and thereby to unbalance said bridge, means to adjust said control couple to rebalance said bridge on unbalance thereof, an adjustable resistance, relay means responsive to unbalance of said bridge to control said last mentioned means, said relay means including opposed electro-magnetic coils, a connection between one end of said measuring resistor and one end of said control resistor including one of said coils, and a connection between the other ends of said measuring and control resistors including the other of said coils and said adjustable resistance.

26. In an electrical control system, a bridge circuit including a measuring resistor, a control resistor, measuring and control contacts respectively engaging said resistors, each said resistor and associated contact being adapted for relative movement to form measuring and control couples, a source of energizing voltage, a connection between said measuring and control contacts including said voltage source, means responsive to the variations in a variable quantity to adjust said measuring couple and thereby to unbalance said bridge, means to adjust said control couple to rebalance said bridge on unbalance thereof, a pair of adjustable resistances, relay means responsive to unbalance of said bridge to control said last mentioned means, said relay means including opposed electro-magnetic coils, a connection between one end of said measuring resistor and one end of said control resistor including one of said coils and one of said adjustable resistances, a connection between the other ends of said measuring and control resistors including the other of said coils and the other of said adjustable resistances, and means to simultaneously and oppositely adjust said adjustable resistances.

27. In an electrical control system, a bridge circuit including a measuring resistor, a control resistor, measuring and control contacts respectively engaging said resistors, each said resistor and associated contact being adapted for relative movement to form measuring and control couples, a source of energizing voltage, a connection between said measuring and control contacts including said voltage source, means responsive to the variations in a variable quantity to adjust said measuring couple and thereby to unbalance said bridge, means to adjust said control couple to rebalance said bridge on unbalance thereof, relay means responsive to unbalance of said bridge to control said last mentioned means, said relay means including opposed electro-magnetic coils, a connection between one end of said measuring resistor and one end of said control resistor including one of said coils, a connection between the other end of said measuring and control resistors including the other of said coils, and means comprising a resistance connected in parallel with at least one of said resistors for determining the ratio of movement of the two couples.

28. In an electrical control system, a bridge circuit including a measuring resistor, a control resistor, measuring and control contacts respectively engaging said resistors, each said resistor and associated contact being adapted for relative movement to form measuring and control couples, a source of energizing voltage, a connection between said measuring and control contacts including said voltage source, means responsive to the variations in a variable quantity to adjust said measuring couple and thereby to unbalance said bridge, means to adjust said control couple to rebalance said bridge on unbalance thereof, an adjustable resistance, relay means responsive to unbalance of said bridge to control said last mentioned means, said relay means including opposed electro-magnetic coils, a connection between one end of said measuring resistor and one end of said control resistor including one of said coils, a connection between the other ends of said measuring and control resistors including the other of said coils and said adjustable resistance, and means comprising a resistance connected in parallel with at least one of said resistors for determining the ratio of movement of the two couples.

29. In an electric control system, a bridge circuit including measuring, control and reset resistors connected in parallel, measuring, control and reset contacts respectively engaging said resistors, each said resistor and associated contact being adapted for relative movement to form measuring, control and reset couples, means responsive to the direction of departure of a control quantity from a normal value of said quantity for correspondingly adjusting the measuring couple, a reversible rotatable electric motor for adjusting the reset couple, means responsive to the direction and duration of said departure for controlling the reversible rotatable electric motor to adjust correspondingly the reset couple, a movable device for controlling the control quantity and for correspondingly adjusting the control couple, and control means, including means interconnecting said contacts, for controlling said control device to give said control device a movement proportional to the adjustment of the measuring couple upon departure of the control quantity and thereafter give said control device a further movement proportional to the adjustment of the reset couple for maintaining the control quantity approximately at said normal value.

30. In an electric control system, a bridge circuit including measuring, control and reset resistors connected in parallel, measuring, control and reset contacts respectively engaging said resistors, each said resistor and associated contact being adapted for relative movement to form measuring, control and reset couples, means responsive to the direction of departure of a control quantity from a normal value of said quantity for correspondingly adjusting the measuring couple, a reversible rotatable electric motor for adjusting the reset couple, means responsive to the direction and duration of said departure for controlling the reversible rotatable electric motor to adjust correspondingly the reset couple, a movable control device for controlling the control quantity and for correspondingly adjusting the control couple, and control means, including current responsive means and means interconnecting said contacts, for controlling said control device to give said control device a movement proportional to the adjustment of the measuring couple upon departure of the control quantity and thereafter to give said control device a further movement proportional to the adjustment of the reset couple for maintaining the control quantity approximately at said normal value.

31. In an electric control system, a bridge circuit including measuring, control and reset resistors connected in parallel, measuring, control and reset contacts respectively engaging said resistors, each said resistor and associated contact being adapted for relative movement to form measuring, control and reset couples, means responsive to the direction of departure of a control quantity from a normal value of said quantity for correspondingly adjusting the measuring couple, means responsive to the direction and duration of said departure for correspondingly adjusting said reset couple, a movable control device for controlling the control quantity and for correspondingly adjusting said control couple, a connection between the reset contact and one of the other contacts, and a connection between said last mentioned connection and the other of said contacts and including control means for controlling said control device to give said control device a movement proportional to the adjustment of the measuring couple upon departure of the control quantity and thereafter to give said control device a further movement proportional to the adjustment of the reset couple for maintaining said control quantity approximately at said normal value.

32. In an electric control system, a bridge circuit including measuring, control and reset resistors connected in parallel, measuring, control and reset contacts respectively engaging said resistors, each said resistor and associated contact being adapted for relative movement to form measuring, control and reset couples, means responsive to the direction of departure of a control quantity from a normal value of said quantity for correspondingly adjusting the measuring couple, a reversible rotatable electric motor for adjusting the reset couple, means responsive to the direction and duration of said departure for controlling the reversible rotatable electric motor to adjust correspondingly the reset couple, a movable control device for controlling the control quantity and for correspondingly adjusting the control couple, a connection between the reset contact and one of the other contacts, and a connection between said last mentioned connection and the other of said contacts and including control means for controlling said control device to give said control device a movement proportional to the adjustment of the measuring couple upon departure of the control quantity and thereafter to give said control device a further movement proportional to the adjustment of the reset couple for maintaining said control quantity approximately at said normal value.

33. In an electric control system, a bridge circuit including measuring, control and reset resistors connected in parallel, measuring, control and reset contacts respectively engaging said resistors, each said resistor and associated contact being adapted for relative movement to form measuring, control and reset couples, means responsive to the direction of departure of a control quantity from a normal value of said quantity for correspondingly adjusting the measuring couple, a reversible rotatable electric motor for adjusting the reset couple, means responsive to the direction and duration of said departure for controlling the reversible rotatable electric motor to adjust correspondingly the reset couple, a movable control device for controlling the control quantity and for correspondingly adjusting the control couple, and control means, including means interconnecting said contacts, for controlling said control device to give said control device a movement proportional to the adjustment of the measuring couple upon departure of the control quantity and thereafter to give said control device a further movement proportional to the adjustment of the reset couple for maintaining the control quantity approximately at said normal value, and means for varying the effect of the reset couple.

34. In an electric control system, a bridge circuit including measuring, control and reset resistors connected in parallel, measuring, control and reset contacts respectively engaging said resistors, each said resistor and associated contact being adapted for relative movement to form measuring, control and reset couples, means responsive to the direction of departure of a control quantity from a normal value of said quantity for correspondingly adjusting the measuring couple, means responsive to the direction and duration of said departure for correspondingly adjusting said reset couple, a movable control device for controlling the control quantity and for correspondingly adjusting said control couple, a connection between the reset contact and one of the other contacts, and a connection between said last mentioned connection and the other of said contacts and including control means for controlling said control device to give said control device a movement proportional to the adjustment of the measuring couple upon departure of the control quantity and thereafter to give said control device a further movement proportional to the adjustment of the reset couple for maintaining said control quantity approximately at said normal value, and means for varying the effect of the reset couple.

35. In an electric control system, a bridge circuit including measuring, control and reset resistors connected in parallel, measuring, control and reset contacts respectively engaging said resistors, each said resistor and associated contact being adapted for relative movement to form measuring, control and reset couples, means responsive to the direction of departure of a control quantity from a normal value of said quantity for correspondingly adjusting the measuring couple, a reversible rotatable electric motor for adjusting the reset couple, means responsive to the direction, duration and amount of said departure for controlling the direction and speed of operation of the reversible rotatable electric motor to adjust correspondingly the reset couple, a movable control device for controlling the control quantity and for correspondingly adjusting the control couple, and control means, including means interconnecting said contacts, for controlling said control device to give said control device a movement proportional to the adjustment of the measuring couple upon departure of the control quantity and thereafter to give said control device a further movement proportional to the adjustment of the reset couple for maintaining the control quantity approximately at said normal value.

36. In an electric control system, a bridge circuit including measuring, control and reset resistors connected in parallel, measuring, control and reset contacts respectively engaging said resistors, each said resistor and associated contact being adapted for relative movement to form measuring, control and reset couples, means responsive to the direction of departure of a control quantity from a normal value of said quantity for correspondingly adjusting the measuring couple, means responsive to the direction, duration and amount of said departure for correspondingly adjusting said reset couple, a movable control device for controlling the control quantity and for correspondingly adjusting said control couple, a connection between the reset contact and one of the other contacts, and a connection between said last mentioned connection and the other of said contacts and including control means for controlling said control device to give said control device a movement proportional to the adjustment of the measuring couple upon departure of the control quantity and thereafter to give said control device a further movement proportional to the adjustment of the reset couple for maintaining said control quantity approximately at said normal value.

HARRY S. JONES.